(12) United States Patent
Obulisami et al.

(10) Patent No.: US 10,771,402 B2
(45) Date of Patent: Sep. 8, 2020

(54) LINK AGGREGATED FIBRE CHANNEL OVER ETHERNET SYSTEM

(71) Applicant: Dell Products L.P., Round Rock, TX (US)

(72) Inventors: Saravanan Obulisami, Tamil Nadu (IN); Ramesh Kumar Subbiah, Tamil Nadu (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 15/605,500

(22) Filed: May 25, 2017

(65) Prior Publication Data
US 2018/0343197 A1 Nov. 29, 2018

(51) Int. Cl.
*H04L 12/931* (2013.01)
*H04L 29/12* (2006.01)

(52) U.S. Cl.
CPC ........ *H04L 49/357* (2013.01); *H04L 61/2038* (2013.01); *H04L 61/6022* (2013.01); *H04L 61/6045* (2013.01)

(58) Field of Classification Search
CPC .... H04L 45/74; H04L 49/351; H04L 61/6022
See application file for complete search history.

(56) References Cited

U.S. PATENT DOCUMENTS

| 8,948,176 | B1* | 2/2015 | Desanti | H04L 45/44 370/351 |
|---|---|---|---|---|
| 9,407,547 | B2 | 8/2016 | DeSanti | |
| 9,942,144 | B1* | 4/2018 | Ramalingam | H04L 45/745 |
| 2012/0106957 | A1* | 5/2012 | Willeke | H04L 29/12207 398/58 |
| 2012/0263187 | A1* | 10/2012 | Belanger | H04L 49/15 370/401 |
| 2013/0336317 | A1* | 12/2013 | Mithyantha | H04L 45/586 370/390 |
| 2016/0036728 | A1* | 2/2016 | Duda | H04L 12/4633 370/357 |

* cited by examiner

*Primary Examiner* — Jeffrey M Rutkowski
*Assistant Examiner* — Chae S Lee
(74) *Attorney, Agent, or Firm* — Haynes and Boone, LLP

(57) ABSTRACT

A link aggregated FCoE system includes a target device, a first FCF device coupled to the target device and a LAG, and a second FCF device coupled to the LAG and to the first FCF device by an ICL. The first and second FCF devices are each associated with a common FCF MAC address. The first FCF device receives, through the LAG, first FCoE data traffic directed to the common FCF MAC address and including a target device destination identifier and, in response, forwards the first FCoE data traffic to the target. The second FCF device receives, through the LAG, second FCoE data traffic directed to the common FCF MAC address and including the target device destination identifier and, in response, forwards the second FCoE data traffic to the first FCF device so that the first FCF device may forward the second FCoE data traffic to the target device.

17 Claims, 21 Drawing Sheets

LINK AGGREGATED FIBRE CHANNEL OVER ETHERNET SYSTEM

BACKGROUND

The present disclosure relates generally to information handling systems, and more particularly to providing link level fault tolerance for Fibre Channel over Ethernet data traffic transmitted via Virtual Link Trunking (VLT) based link aggregated Fibre Channel Forwarding information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as switches utilize link aggregation to combine multiple network connections in order to increase throughput, provide redundancy, and/or provide a variety of other link aggregation benefits known in the art. For example, some switches utilize Virtual Link Trunking (VLT), which is a proprietary link aggregation protocol that is provided by the Assignee of the present disclosure and that allows for the setup of an aggregated link to a plurality of different switches. VLT is a layer-2 link aggregation protocol that may be utilized by servers and access switches to, for example, provide a redundant load-balanced connection to the core-network in a loop-free environment, provide uplinks between access switches and core switches, and/or provide a variety of other VLT benefits that would be apparent to one of skill in the art. However, in network topologies utilizing Fibre Channel communications, the use of link aggregation raises some issues.

For example, network topologies utilizing Fibre Channel communications may include Fibre Channel switch devices such as, for example, Fiber Channel Forwarder (or Fibre Channel over Ethernet (FCoE) Forwarder) devices (FCF devices) that operate to transmit FCoE communications between Converged Network Adapters (CNAs) in host devices and the target devices with which they communicate. When multiple FCF devices are part of multi-switch Link Aggregation Groups (LAGs) such as those provided via VLT discussed above, conventional systems isolate the different FCF devices into two different network fabrics (e.g., by assigning each of the FCF devices different FCoE mapped address prefixes (FC-MAPs) and FCoE Virtual Local Area Networks (VLANs)). In such conventional systems, FCoE is only supported on individual FCF devices, as multiple FCFs operating as VLT peers are not capable of handling FCoE, and end-to-end path level redundancy (e.g., between the CNAs and the target devices) must be achieved using Multi-Path Input/Output (MPIO) on the host devices (as is done in "air-gapped" network fabrics.) As such, the FCF devices in such conventional systems act as independent Fibre Channel switches, with the link fault tolerance provided by LAGs (and/or link aggregation infrastructure provided by VLT) unused, and the LAGs (and/or link aggregation infrastructure provided by VLT) limited to the transmission of non-FCoE traffic.

Accordingly, it would be desirable to provide an improved link aggregated FCoE system.

SUMMARY

According to one embodiment, an Information Handling System (IHS) includes a communication subsystem; a processing system that is coupled to the communications subsystem; a memory system that is coupled to the processing system and that includes instructions that, when executed by the processing system, cause the processing system to provide a Fibre Channel Forwarding (FCF) engine that is configured to: receive, through the communication subsystem via a Link Aggregation Group (LAG), first Fibre Channel over Ethernet (FCoE) data traffic that is directed to a common FCF MAC address and that includes a first target device destination identifier; forward, through the communication subsystem in response to determining that the first target device destination identifier is associated with a first target device that is coupled to the communication subsystem, the first FCoE data traffic to the first target device; receive, through the communication subsystem via the LAG, second FCoE data traffic that is directed to the common FCF MAC address and that includes the second target device destination identifier; and forward, through the communication subsystem via an Inter-Chassis Link (ICL) in response to determining that the second target device destination identifier is associated with a second target device that is reachable through an FCF device that is coupled to the ICL, the second FCoE data traffic to the second FCF device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
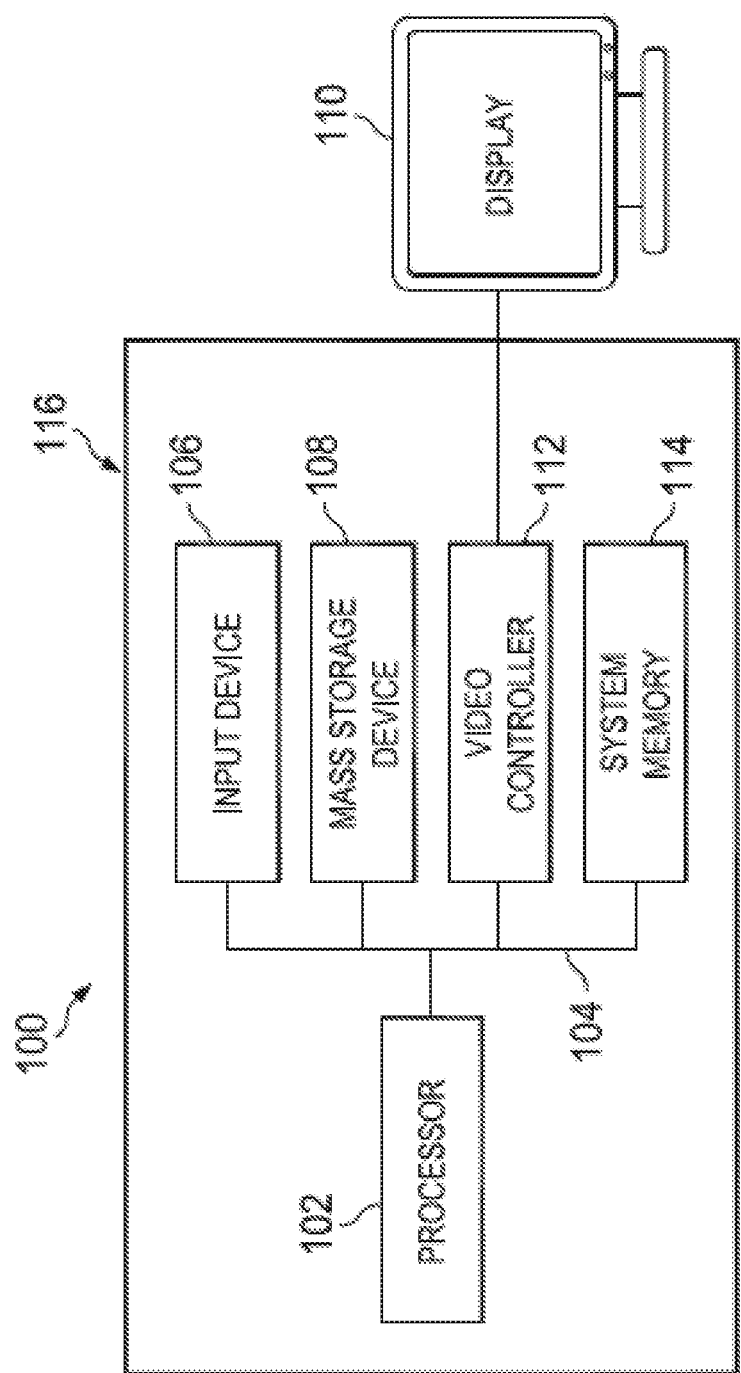
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
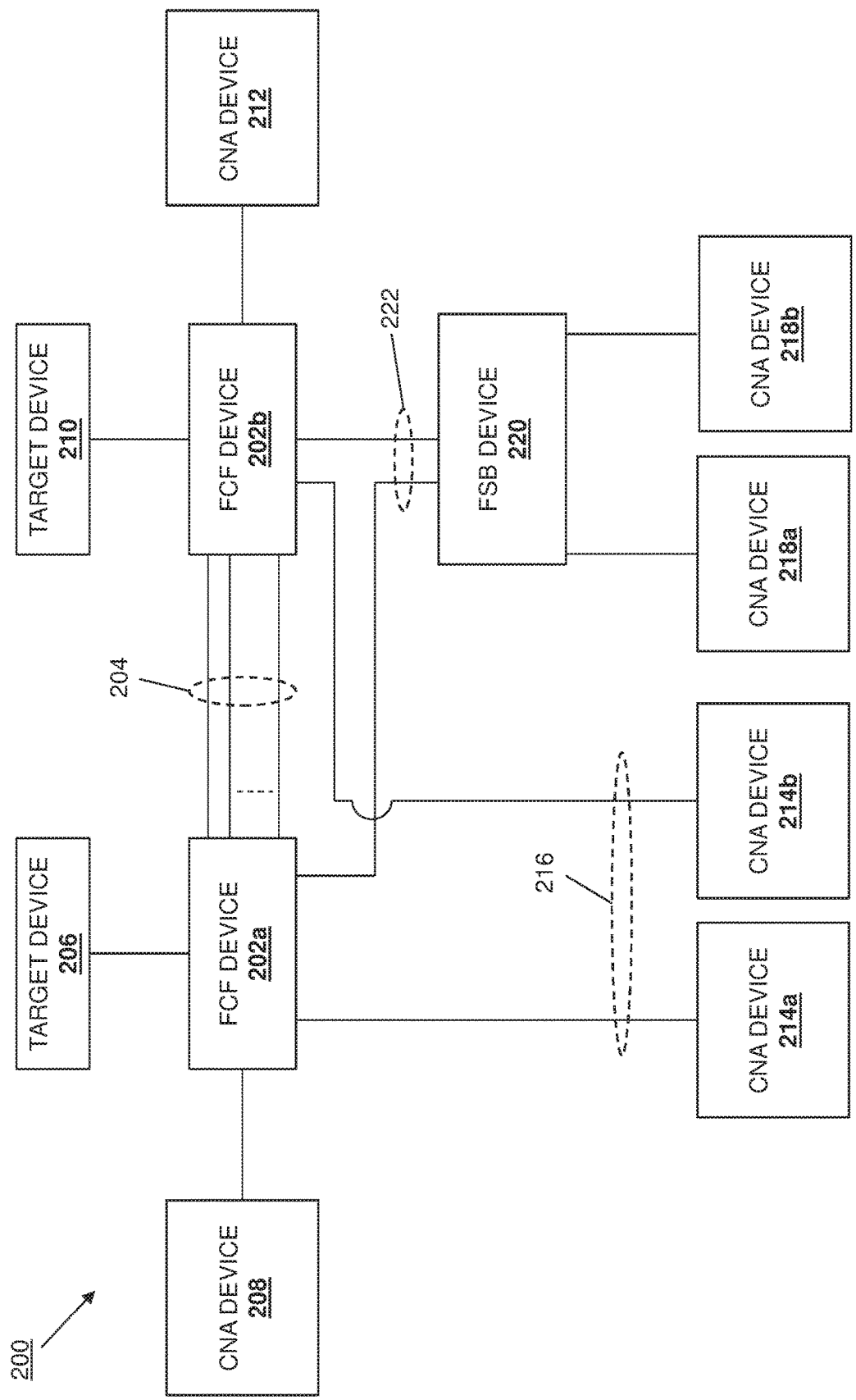
FIG. 2 is a schematic view illustrating an embodiment of a link aggregation FCoE system.

Referring now to FIG. 2, an embodiment of a link aggregated Fibre Channel over Ethernet (FCoE) system 200 is illustrated. In the specific embodiments discussed below, the link aggregation utilized in the link aggregated FCoE system 200 is provided via the Virtual Link Trunking (VLT) protocol, which a proprietary link aggregation protocol available from DELL® Technologies of Round Rock, Tex., United States. However, other link aggregation protocols may be utilized in place of the VLT protocol while remaining within the scope of the present disclosure. In the illustrated embodiment, the link aggregated FCoE system 200 includes a pair of Fibre Channel Forwarder (FCF) devices 202a and 202b, although on of skill in the art will recognize that networks may (and typically will) include many more FCF devices. Each of the FCF devices 202a and 202b may be the IHS 100 discussed above with reference to FIG. 1, and/or may include some or all of the components of the IHS 100. In a specific embodiment, the FCF devices 202a and 202b are provided by Fibre Channel switches that, as discussed below, provide for the transmittal of FCoE data traffic (as well as non-FCoE Ethernet data traffic) between computing devices. However, other types of computing devices may benefit from the teachings of the present disclosure, and thus are envisioned as falling within its scope. The FCF devices 202a and 202b are connected together by an Inter-Chassis Link (ICL) 204 such as, for example, a VLT interconnect (VLTi), that may include one or more connections between ICL port(s) on the FCF device 202a and one or more ports on the FCF device 202b. In a specific embodiment, the FCF devices 202a and 202b are VLT peer devices.

In the illustrated embodiment, the FCF device 202a is coupled to a target device 206 via a Fibre Channel link. In an embodiment, the target device 206 may be the IHS 100 discussed above with reference to FIG. 1, and/or may include some or all of the components of the IHS 100. In a specific embodiment, the target device 206 may be a Fibre Channel storage device, although other Fibre Channel fabric devices will fall within the scope of the present disclosure as well. The FCF device 202a is also coupled to a Converged Network Adapter (CNA) device 208 via one or more non-Link Aggregation Group (non-LAG) ports (also known as "orphan" ports). In an embodiment, the CNA device 208 may be the IHS 100 discussed above with reference to FIG. 1, and/or may include some or all of the components of the IHS 100. In a specific example, the CNA device 208 may be provided on a server device to, for example, combine the functionality of a Host Bus Adapter (HBA) and a Network Interface Controller (NIC) to converge access to a Storage Area Network (SAN) along with a general purpose computer network.

Similarly, in the illustrated embodiment, the FCF device 202b is coupled to a target device 210 via a Fibre Channel link. In an embodiment, the target device 210 may be the IHS 100 discussed above with reference to FIG. 1, and/or may include some or all of the components of the IHS 100. In a specific embodiment, the target device 210 may be a Fibre Channel storage device, although other Fibre Channel fabric devices will fall within the scope of the present disclosure as well. The FCF device 202b is also coupled to a Converged Network Adapter (CNA) device 212 via one or more non-LAG ports (also known as "orphan" ports). In an embodiment, the CNA device 212 may be the IHS 100 discussed above with reference to FIG. 1, and/or may include some or all of the components of the IHS 100. In a specific example, the CNA device 212 may be provided on a server device to, for example, combine the functionality of a Host Bus Adapter (HBA) and a Network Interface Controller (NIC) to converge access to a Storage Area Network (SAN) along with a general purpose computer network.

A pair of CNA devices 214a and 214b are coupled to the FCF devices 202a and 202b via a LAG 216 that includes a plurality of LAG links between LAG ports on the CNA devices 214a and 214b and the FCF devices 202a and 202b. In an embodiment, the CNA devices 214a and 214b may each be the IHS 100 discussed above with reference to FIG. 1, and/or may include some or all of the components of the IHS 100. In a specific example, the CNA devices 214a and 214b may each be provided on a server device to, for example, combine the functionality of an HBA and a NIC to converge access to a SAN along with a general purpose computer network. In a specific embodiment, the LAG 216 is a VLT LAG associated with a first port channel (e.g., port channel 20.)

A pair of CNA devices 218a and 218b are coupled to a Fibre Channel Initialization Protocol (FIP) Snooping Bridge (FSB) device 220 that is coupled to the FCF devices 202a and 202b via a LAG 222 that includes a plurality of LAG links between LAG ports on the FSB device 220 and the FCF devices 202a and 202b. In an embodiment, the CNA devices 218a and 218b may each be the IHS 100 discussed above with reference to FIG. 1, and/or may include some or all of the components of the IHS 100. In a specific example, the CNA devices 218a and 218b may each be provided on a server device to, for example, combine the functionality of a HBA and a NIC to converge access to a SAN along with a general purpose computer network. In an embodiment, the FSB device 220 may each be the IHS 100 discussed above with reference to FIG. 1, and/or may include some or all of the components of the IHS 100. In a specific example, the FSB device 220 may each be a Fibre Channel switch device that is configured to snoop FIP packets during discovery and login in order to implement dynamic data integrity mechanisms (e.g., using Access Control Lists (ACLs)) to ensure that only valid FCoE traffic is allowed through the fabric. In a specific embodiment, the LAG 222 is a VLT LAG associated with a second port channel (e.g., port channel 10.) While a specific link aggregated FCoE system 200 has been described for purposes of the discussions below, one of skill in the art in possession of the present disclosure will recognize that a variety of different devices and device configurations may be provided in a link aggregated FCoE system that will remain within the scope of the present disclosure.

Figure 3:
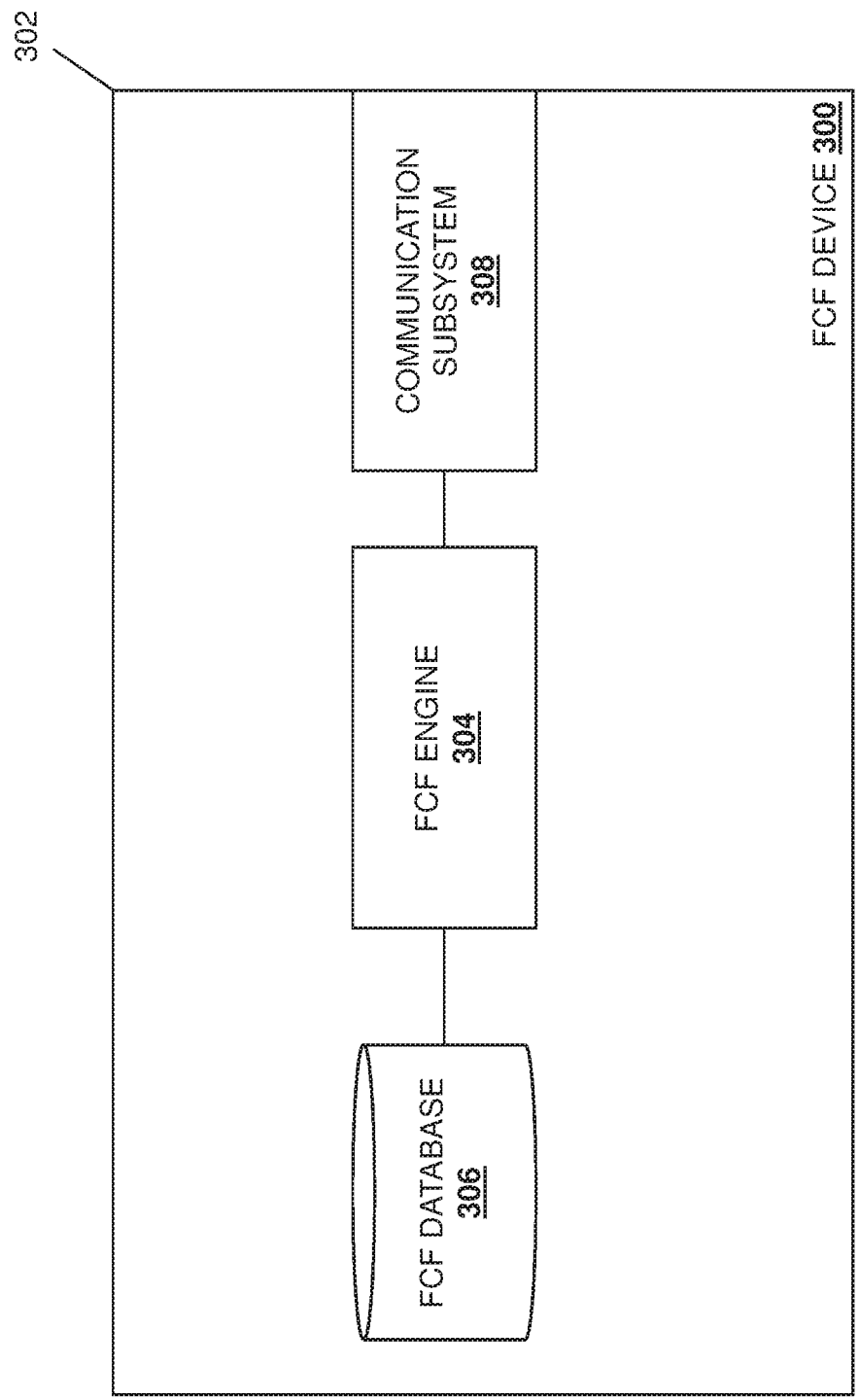
FIG. 3 is a schematic view illustrating an embodiment of an FCF device used in the link aggregated FCoE system of FIG. 2.

Referring now to FIG. 3, an embodiment of an FCF device 300 is illustrated that may be either of the FCF devices 202a and 202b discussed above with reference to FIG. 2. As such, the FCF device 300 may be the IHS 100 discussed above with reference to FIG. 1, may include some or all of the components of the IHS 100, and in specific embodiments may be a Fibre Channel switch that provides for the transmittal of FCoE data traffic (as well as non-FCoE Ethernet data traffic) between computing devices. In the illustrated embodiment, the FCF device 300 includes a chassis 302 that houses the components of the FCF device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an FCF engine 304 that is configured to perform the functions of the FCF engines and FCF devices discussed below.

The chassis 302 may also house a storage device (not illustrated, but which may include the storage device 108 discussed above with reference to FIG. 1) that is coupled to the FCF engine 304 (e.g., via a coupling between the storage device and the processing system) and that includes an FCF database 306 that stores data and/or other information utilized to provide the functionality discussed below. The chassis 302 may also house a communication subsystem 308 that is coupled to the FCF engine 304 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 308 may include the ports (e.g., the non-LAG ports, the LAG ports, and/or other ports discussed below) utilized for providing the links to target devices, CNA devices, and FSB devices discussed below. While a specific embodiment of an FCF device has been illustrated and described, one of skill in the art in possession of the present disclosure will recognize that FCF devices may include a variety of other components for providing conventional FCF device functionality, as well as the functionality discussed below, while remaining within the scope of the present disclosure.

Figure 4:
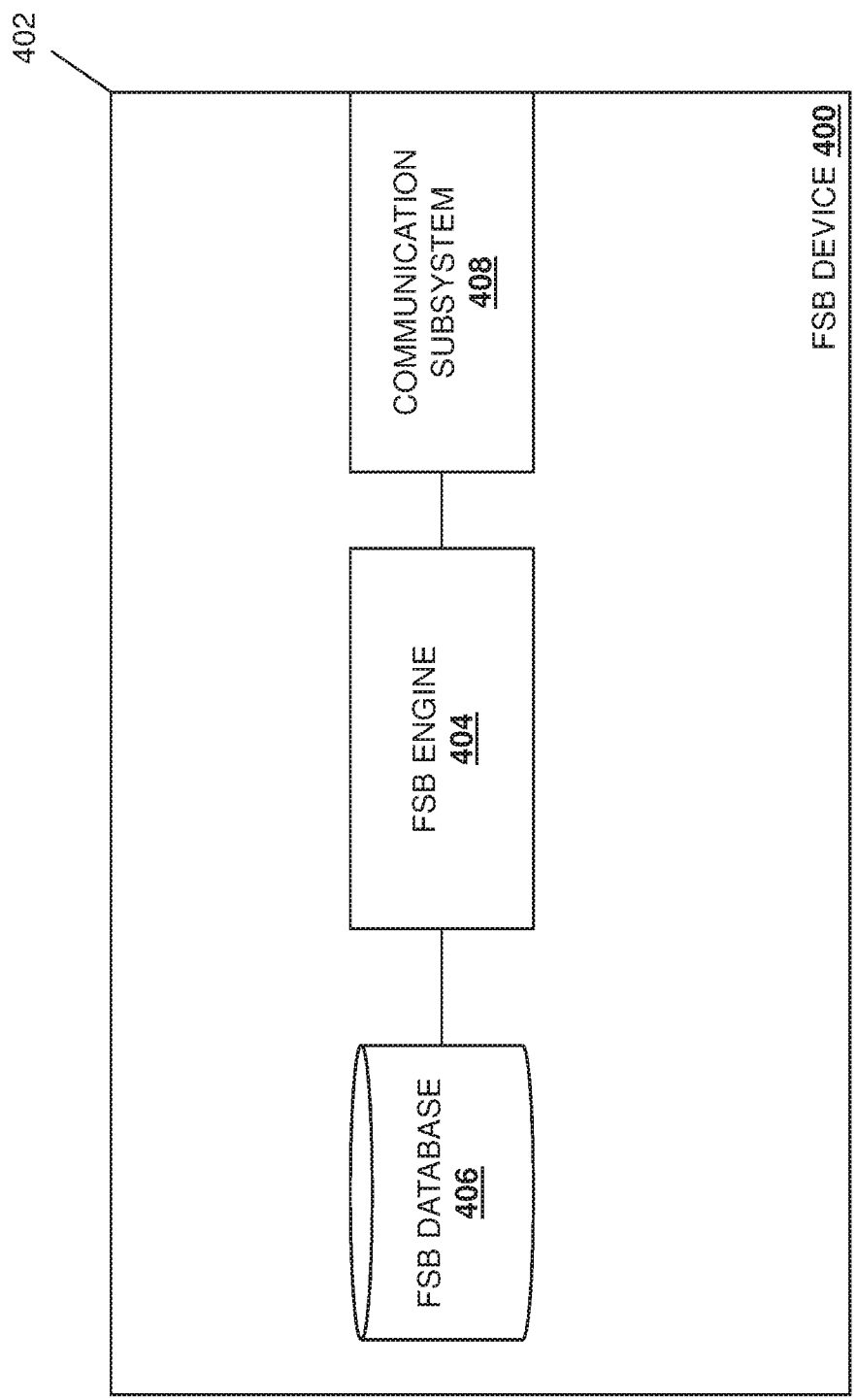
FIG. 4 is a schematic view illustrating an embodiment of an FSB device used in the link aggregated FCoE system of FIG. 2.

Referring now to FIG. 4, an embodiment of an FSB device 400 is illustrated that may be either the FSB device 220 discussed above with reference to FIG. 2. As such, the FSB device 400 may be the IHS 100 discussed above with reference to FIG. 1, may include some or all of the components of the IHS 100, and in specific embodiments may be a Fibre Channel switch device that is configured to snoop FIP packets during discovery and login in order to implement dynamic data integrity mechanisms (e.g., using ACLs) to ensure that only valid FCoE traffic is allowed through the fabric. In the illustrated embodiment, the FSB device 400 includes a chassis 402 that houses the components of the FSB device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an FSB engine 404 that is configured to perform the functions of the FSB engines and FSB devices discussed below.

The chassis 402 may also house a storage device (not illustrated, but which may include the storage device 108 discussed above with reference to FIG. 1) that is coupled to the FSB engine 404 (e.g., via a coupling between the storage device and the processing system) and that includes an FSB database 406 that stores data and/or other information utilized to provide the functionality discussed below. The chassis 402 may also house a communication subsystem 408 that is coupled to the FSB engine 404 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 408 may include the ports (e.g., the LAG ports, and/or other ports discussed below) utilized for providing the links to the FCF devices and CNA devices discussed below. While a specific embodiment of an FSB device has been illustrated and described, one of skill in the art in possession of the present disclosure will recognize that FSB devices may include a variety of other components for providing conventional FSB device functionality, as well as the functionality discussed below, while remaining within the scope of the present disclosure.

Figure 5:
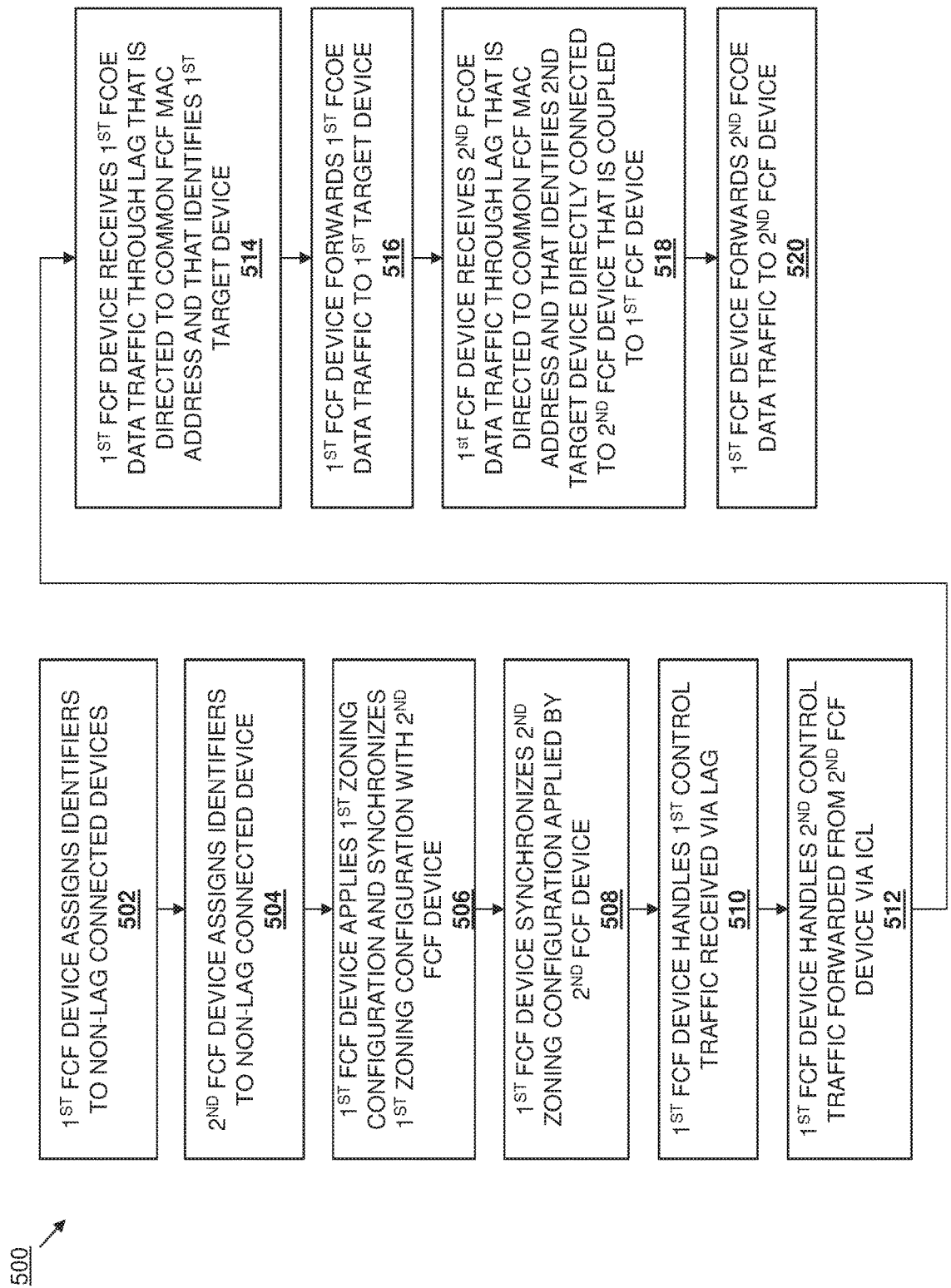
FIG. 5 is a flow chart illustrating an embodiment of a method for providing link aggregated FCoE communications.

Referring now to FIG. 5, an embodiment of a method 500 for providing link aggregated FCoE communications is illustrated. As discussed below, the systems and methods of the present disclosure provide for the utilization of a link aggregated infrastructure (e.g., a VLT infrastructure) to achieve link level fault tolerance for FCoE traffic on link aggregated port channels (e.g., VLT port channels). The method 500 includes a variety of blocks, and one of skill in the art in possession of the present disclosure will recognize that in different embodiments, some blocks may not be performed. Furthermore, prior to or during the method 500, a variety of actions may be performed to configure the link aggregated FCoE system 200 to perform the functionality described below.

For example, during the method 500, the FCF devices 202a and 202b operating as link aggregated peer devices (e.g., VLT peers) act a single, logical FCF device when viewed from a device connected to the FCF devices 202a and 202b via a LAG (e.g., the CNA devices 214a and 214b connected to the LAG 206, or the FSB device 220 connected to the LAG 222). This is enabled, at least in part, in response to a network administrator or other user assigning (e.g., via configuration commands) each of the FCF devices 202a and 202b a common FCF MAC address (e.g., each of the FCF devices 202a and 202b is associated with the same or "common" FCF MAC address) during, for example, the setup of the LAGs 216 and/or 222. Furthermore, each of the FCF devices 202a and 202b may be assigned a respective local FCF MAC address (i.e., the FCF device 202a may be assigned a first local FCF MAC address, and the FCF device 202b may be assigned a second local FCF MAC address that is different than the first local FCF MAC address), and may sync or otherwise share that local FCF MAC address with the other FCF device.

As such, in the FCF device communications discussed below, different FCF MAC addresses may be used to communicate with the same FCF device. For example, CNA devices connected to non-LAG ports on the FCF devices 202a and 202b (e.g., the CNA device 208 and the CNA device 212 connected via orphan ports) will use local FCF MAC addresses to communicate with their directly connected FCF devices (e.g., the CNA device 208 will use the first local FCF MAC address discussed above to communicate with the FCF device 202a, and the CNA device 212 will use the second local FCF MAC address discussed above to communication with the FCF device 202b.) Meanwhile CNA devices connected to the FCF devices 202a and 202b via LAGs (e.g., the CNA devices 214a, 214b, 218a, and 218b) will use the common FCF MAC address to communicate with the FCF devices 202a and 202b.

In addition, before or during the method 500, the target devices 206 and 210 may log in to their respective FCF devices 202a and 202b by, for example, providing fabric logins (FLOGIs) to that FCF device. That FCF device will then respond with a FLOGI accept, and perform a login information synchronization with the other FCF device. In addition, the target devices 206 and 210 may also provide port logins (PLOGIs) to their respective FCF devices, and those FCF devices will respond with a PLOGI accept, and perform a name server information synchronization with the other FCF device.

The method 500 may begin at block 502 where a first FCF device may assign identifier(s) to a non-LAG connected devices, and block 504 where a second FCF device may assign identifier(s) to a non-LAG connected devices. In an embodiment, at block 502, the FCF engine 304 included in the FCF device 202a/300 may operate to assign a Fibre Channel identifier (FCID) to the target device 206 and the CNA device 208, and at block 504 the FCF engine 304 included in the FCF device 202b/300 may operate to assign an FCID to the target device 210 and the CNA device 210. As would be appreciated by one of skill in the art in possession of the present disclosure, the assignment of FCIDs may be based on domain identifiers, areas, port numbers, and/or other information. As such, using conventional FCID assignment methods, a device connected to port 1 on the FCF device 202a could be assigned the same FCID as a device connected to port 1 on the FCF device 202b. However, at blocks 502 and 504, the FCF devices 202a and 202b may operate to ensure that each FCID assigned to the devices is unique. In an embodiment, fabric port numbers and virtual fabric port numbers provided by the FCF device 202b may be logically extended (i.e., relative to fabric port numbers and virtual fabric port number provided by the FCF device 202a) by having the FCF device 202a utilize a first range of port numbers to assign FCIDs to its devices, and the FCF device 202b utilizes a second range of port numbers to assign FCIDs to its devices. For example, one of skill in the art in possession of the present disclosure will recognize that the assignment of unique FCIDs to the FCF devices (or other VLT peers) may be performed utilizing a variety of existing methods for FCID extension.

For example, the FCF device 202a may support 128 ports, and may utilize a first port number range of 1-128 for use in assigning fabric ports and virtual fabric ports. As such, if the FCF device 202b also supports 128 ports, the port number range of 129-256 may be utilized by the FCF device 202b for use in assigning fabric ports and virtual fabric ports. As such, each of the FCF devices 202a and 202b may be assigned a unique unit identifier (e.g., the FCF device 202a may be assigned "unit ID 1", and the FCF device 202b may be assigned "unit ID 2") in the link aggregation domain (e.g., the VLT domain), and each unique unit identifier may be associated with a different port number range so that each device connected to the FCF devices 202a and 202b via a non-LAG port is assigned a unique FCID (e.g., the CNA device 208 may be assigned an FCID based on the port number 1, the target device 206 may be assigned an FCID based on the port number 2, the CNA device 212 may be assigned an FCID based on the port number 129, the target device 210 may be assigned an FCID based on the port number 130) by their respective FCF device.

The method 500 then proceeds to block 506 where the first FCF device may apply a first zoning configuration and synchronize the first zoning configuration with the second FCF device, and to block 508 where the first FCF device may synchronize a second zoning configuration applied by the second FCF device. In order to provide for the functionality discussed below, the zoning configurations in each of the FCF devices 202a and 202b should be identical. As such, at block 506, the FCF engine 304 in the FCF device 202a/300 may operate to apply a first zoning configuration and then synchronize that first zoning configuration with the FCF device 202b (e.g., by sharing first zoning configuration information for the first zoning configuration through the communication subsystem 308 with the FCF device 202b.) Similarly, at block 506, the FCF engine 304 in the FCF device 202b/300 may operate to apply a second zoning configuration and then synchronize that second zoning configuration with the FCF device 202a (e.g., by sharing second zoning configuration information for the second zoning configuration through the communication subsystem 308 with the FCF device 202a) such that the FCF device 202a synchronizes the second zoning configuration that was applied by the FCF device 202b. As would be understood by one of skill in the art in possession of the present disclosure, such zoning configurations may apply to devices connected to both LAG ports and non-LAG ports on the FCF devices 202a and 202b. Furthermore, in some embodiments, the FCF engines 304 in the FCF devices 202a and 202b may include a synchronization mechanism that operates to periodically synchronize zoning configurations across the FCF devices 202a and 202b, while in other embodiments, the FCF engines 304 in the FCF devices 202a and 202b may operate to determine mismatches between zoning configurations on the FCF devices 202a and 202b and then report those mismatches to a network administrator (e.g., in response to a "show zoning configuration mismatches" command.) In specific examples, the FCF engines 304 in the FCF devices 202a and 202b may be configured to correct mismatches between zoning configurations in the FCF devices 202a and 202b to ensure that the zoning configurations on the FCF devices 202a and 202b are identical in order to ensure that communication between the FCF devices 202a and 202b is not disrupted. Furthermore, in other examples, the synchronization of zoning configurations may not be performed automatically and, rather, a network administrator may simply apply the same zoning configurations to the FCF devices 202a and 202b.

The method 500 then proceeds to block 510 where the first FCF device may handle first control traffic received via a LAG, and to block 512 where the first FCF device may handle second control traffic forwarded by the second FCF device via an ICL. In an embodiment, at or prior to the method 500, a primary link aggregation device and a second link aggregation device may be designated from the FCF devices in the link aggregated FCoE system 200, with the primary link aggregation device controlling handling control data traffic received on a LAG, and the secondary link aggregation device providing control data traffic received on a LAG to the primary link aggregation node device. The designation of the primary link aggregation node and the secondary link aggregation node may be based on election mechanisms known in the art (e.g., lowest MAC address). In specific examples provided below, the FCF device 202a is designated as a primary link aggregation device, while the FCF device 202b is designated as a secondary link aggregation device. At block 510, the FCF engine 304 in the FCF device 202a/300 may receive first control data traffic through the communication subsystem 308 via either of the LAGs 216 or 222 and, in response, handle that first control data traffic. At block 512, the FCF engine 304 in the FCF device 202b/300 may receive second control data traffic through the communication subsystem 308 via either of the LAGs 216 or 222 and, in response, tunnel that second control data traffic through the ICL 204 to the FCF device 202a (e.g., while providing that second control data traffic with a link aggregation header such as a VLT header) so that the FCF device 202a may handle that second control data traffic as well.

In an embodiment, the control data traffic handled by the primary link aggregation device at blocks 510 and 512 may include control data traffic that is received during FCoE Initialization Protocol (FIP) communications (as well as other FCoE data traffic) that includes a DID and a well-defined fibre channel address. In one example, the primary link aggregation device (e.g., the FCF device 202a in the example above) may receive control data traffic directly from the FSB device 220 (e.g., due to the FSB device 220 selecting links in the LAG 222 that are directly connected to the FCF device 202a, discussed below), and then operate to respond to the control data traffic and populate its FCF device tables (e.g., in its FCF database 306), as well as synchronize the information in its FCF device tables with the secondary link aggregation device (e.g., the FCF device 202b in the example above) by sending synchronization information to the secondary link aggregation node device. In such examples, the secondary link aggregation device may operate to use that synchronization information to populate its FCF device tables (e.g., in its FCF database 306.)

In another example, the secondary link aggregation device (e.g., the FCF device 202b in the example above) may receive control data traffic directly from the FSB device 220 (e.g., due to the FSB device 220 selecting links in the LAG 222 that are directly connected to the FCF device 202b, discussed below), and then operate to tunnel the control data traffic to the primary link aggregation device (e.g., the FCF device 202a in the example above) via the ICL 204 (e.g., by providing the control data traffic with link aggregation header information (e.g., VLT header information) and LAG information (e.g., VLT LAG information) that identifies the links on which that control data traffic were received. The primary link aggregation device may then treat the control data traffic as if it were received locally via the LAG 222 and operate to respond to the control data traffic and populate its FCF device tables (e.g., in its FCF database 306), as well as synchronize the information in its FCF device tables with the secondary link aggregation device (e.g., the FCF device 202b in the example above) by sending synchronization information to the secondary link aggregation node device, similarly as discussed above.

As such, for control data traffic, the FCF devices 202a and 202b may operate to maintain a table (e.g., in their FCF databases 306) for login entries. For example, such a table may include fields for FCIDs, enode MAC addresses, port numbers, and whether connections are local or remote. For virtual fabric port logins, enode MAC addresses may be synced in each of the tables in the FCF devices 202a and 202b, while for fabric port logins, only the FCIDs may be synced in each of the tables in the FCF devices 202a and 202b. Furthermore, when the target port on the FCF device 202a is an orphan port, the FCF device 202b may operate to update its FCF device tables as information is learned on the ICL 204. In addition, a table may also be maintained (in the FCF databases 306) for name server entries. For example, such a table may include fields for FCIDs, interfaces, enode World Wide Port Numbers (WWPNs), enode World Wide Node Names (WWNNs), classes of service, and whether connections are local or remote. As such, hardware table programming (e.g., programming of Access Control Lists (ACLs) for virtual fabric ports (e.g., VLT ports)) may be replicated for the ICL 204 as well, and may be performed in both of the FCF devices 202a and 202b (e.g., the VLT peers.) One of skill in the art in possession of the present disclosure will recognize that these programming actions will allow data traffic to be received (e.g., by the FCF device 202a) on a LAG (e.g., one of the LAGs 216 or 220) when the LAG ports are available, while allowing data traffic to be received on the ICL 204 if there is a failure of links in the LAGs (e.g., the links to the FCF device 202a.)

The method 500 then proceeds to blocks 514, 516, 518, and 520 where FCoE data traffic is routed from CNA devices to target devices. As discussed below, the behavior of the FCF devices 202a and 202b may change depending on which CNA device is communicating with which target device. As such, examples of a variety of those scenarios are provided below. In some embodiments, the first FCoE data traffic received by either of the FCF devices 202a and 202b may have been forwarded by the FSB engine 404 in the FSB device 220 from either of the CNA devices 218a or 218b. As would be appreciated by one of skill in the art in possession of the present disclosure, using conventional forwarding methods, the FSB device 220 may select any link in the LAG 222 (e.g., based on a hashing algorithm) through which to forward the first FCoE data traffic received from either of the CNA devices 218a and 218b. However, if the FSB device 220 selects a link to an FCF device that is not directly connected to the target device for which the first FCoE data traffic is destined, that first FCoE data traffic will then need to be forwarded through the ICL 204 in order to reach the target device for which the first FCoE data traffic is destined (e.g., via the directly connected FCF device), which can provide for inefficient routing of the first FCoE data traffic. In order to ensure efficient routing of all FCoE data traffic, the FSB device 220 in the link aggregated FCoE system 200 attempts to forward FCoE data traffic to the FCF device that is directly connected to the target device for which that FCoE data traffic is destined.

For example, the FSB device 220 may learn its neighboring devices using the Link Layer Discovery Protocol (LLDP) operating on the links between the FSB device 220 and the FCF devices 202a and 202b. Using remote MAC addresses learned during LLDP packet exchanges, the FSB device 220 may then determine which of the links in the LAG 222 are connected to the FCF device 202a, and which of the links in the LAG 222 are connected to the FCF device 202b. As such, the FSB device 220 may create different trunks associated with the links. For example, the FSB device 220 may create a first trunk associated with (e.g., having ports connected to) all of the links in the LAG 222, a second trunk associated with (e.g., having ports connected to) the link(s) in the LAG 222 that are connected to the FCF device 202a, and a third trunk associated with (e.g., having ports connected to) the link(s) in the LAG 222 that are connected to the FCF device 202b. As such, non-FCoE Ethernet data traffic may be associated with a first Virtual Local Area Network (VLAN) that is forwarded using the first trunk (i.e., all the links in the LAG 222), while FCoE data traffic may be associated with a second VLAN that is forwarded using the second trunk and the third trunk.

The FSB device 220 may then send FCoE data traffic to its destined target device using either the second trunk or the third trunk based on knowledge of which of the FCF devices 202a and 202b that target device is connected to. For example, the FCF engine 304 in each of the FCF devices 202a and 202b may be configured to send its unit identifier (discussed above) and its total number of ports in a Type-Length-Value (TLV) structure of an LLDP data packet. As discussed above, the FCID assigned to the devices connected to non-LAG ports on the FCF devices 202a and 202b may be based on the unit identifiers for those FCF devices and the port number of the port connected to those devices, and the sharing of this information with the FSB device 220 allows the FSB engine 404 in the FSB device 220/400 to determine which FCF device is connected to which target device. As such, the FSB device 220 may then determine which trunk to use to reach a particular target device. Furthermore, the FSB device 220 may apply ingress Access Control Lists (ACLs), and forward FCoE data traffic to target devices based on the FCID of those target devices and using the trunk associated with its directly connected FCF device. In other embodiments, methods/protocols other than LLDP may be utilized such as, for example, the FCoE initialization protocol (or other protocols understood by the FSB device 220.)

As such, in some embodiments of the method 500, at block 514 the first FCF device receives first FCoE data traffic through the LAG that is directed to a common FCF MAC address and that identifies the first target device, and at block 516 the first FCF device will forward the first FCoE data traffic to the first target device. In an embodiment, at block 514, the FCF engine 304 in the FCF device 202a/300 may receive first FCoE data traffic via the LAG 216 or via the LAG 222. Such first FCF data traffic will include the common FCF MAC address as its destination MAC address, and may include a target device destination identifier (DID) that identifies the target device 206. At block 514, the FCF engine 204 in the FCF device 202a/300 will then identify the target device 208 using the target device DID, and then forward the first FCoE data traffic to the target device 206 at block 516.

In some embodiments of the method 500, at block 518 the first FCF device receives second FCoE data traffic through the LAG that is directed to a common FCF MAC address and that identifies the second target device, and at block 520 the first FCF device then forwards the second FCoE data traffic to the second FCF device. For example, the links in the LAG 216 that are connected to the FCF device 202b, or the links in the LAG 222 that are connected to the FCF device 202b, may be unavailable, requiring that the second FCoE data traffic destined for the target device 210 be initially sent to the FCF device 202a. In an embodiment, at block 518, the FCF engine 304 in the FCF device 202a/300 may receive second FCoE data traffic via the LAG 216 or via the LAG 222. Such second FCF data traffic will include the common FCF MAC address as its destination MAC address, and may include a target device DID that identifies the target device 210. At block 520, the FCF engine 304 in the FCF device 202a/300 will then identify the target device 210 using the target device DID. The FCF engine 304 in the FCF device 202*a*/300 may then determine that the target device 210 is learned on the ICL 204 and, in response, forward the second FCoE data traffic through the ICL 204 (i.e., at the layer 2 level) to the FCF device 202*b*. The FCF engine 304 in the FCF device 202*b*/300 will then forward that second FCoE data traffic to the target device 210.

In situations where the CNA devices directly connected to non-LAG ports on an FCF device send FCoE data traffic to the target device directly connected to that FCF device, those CNA devices may use the local FCF MAC address for that FCF device. For example, the CNA devices 208 or 214*a* directly connected to the FCF device 202*a* may send FCoE data traffic to the FCF device 202*a* with the first local FCF MAC address (discussed above) as its destination MAC address, and a target device DID that identifies the target device 206, and the FCF device 202*a* will forward that FCoE data traffic to the target device 206. The CNA 212 may communicate with the target device 210 in substantially the same manner. Furthermore, in situations where the CNA devices directly connected to non-LAG ports on an FCF device send FCoE data traffic to a target device directly connected to a different FCF device, those CNA devices may use the local FCF MAC address for the directly connected FCF device as well. For example, the CNA devices 208 or 214*a* directly connected to the FCF device 202*a* may send FCoE data traffic to the FCF device 202*a* with the first local FCF MAC address (discussed above) as its destination MAC address, and a target device DID that identifies the target device 210, and the FCF device 202*a* will then change the destination MAC address to the second local FCF MAC address (discussed above) and send that FCoE data traffic through the ICL 204 to the FCF device 202*b*, with the FCF device 202*b* forwarding that FCoE data traffic to the target device 210. The CNA 212 may communicate with the target device 208 in substantially the same manner.

In situations like those described above with the CNA devices 208 or 214*a* connecting to the target device 210, each of the FCF devices 202*a* and 202*b* may maintain a table (e.g., in their FCF databases 306) for login entries. For example, such a table may include fields for FCIDs, enode MAC addresses, port numbers, and whether connections are local or remote. For virtual fabric port logins, enode MAC addresses may be synced along with the FCIDs in each of the tables in the FCF devices 202*a* and 202*b*, while for fabric port logins, only the FCIDs may be synced in each of the tables in the FCF devices 202*a* and 202*b*. In addition, a table may also be maintained (in the FCF databases 306) for name server entries. For example, such a table may include fields for FCIDs, interfaces, enode World Wide Port Numbers (WWPNs), enode World Wide Node Names (WWNNs), classes of service, and whether connections are local or remote. Because logins from the CNA devices to the target devices are performed on interfaces connected to a particular FCF device, the other FCF device will update its table as both are learned on the ICL 204. In addition, the name server database would also point to the ICL 204.

As would be appreciated by one of skill in the art in possession of the present disclosure, conventional CNA devices transmitting FCoE data traffic are generally not aware when they are communicating via a LAG and, as such, may operate to transmit data traffic using advertised FCF MAC addresses from the FCF devices (e.g., the local FCF MAC addresses discussed above). However, the link aggregated FCoE system 200 allows network administrators to configure the LAG for the FCF devices whether it is connected to a "LAG-aware" CNA device transmitting FCoE data traffic, or a "LAG-unaware" CNA device transmitting FCoE data traffic. In situations where a LAG-aware CNA devices are present on the LAG, the FCF devices may advertise the common FCF MAC addresses discussed above. However, in situations where a LAG-unaware CNA devices are present on the LAG, the FCF devices may advertise the local FCF MAC addresses discussed above This allows the different functionality of the FCF devices discussed above, as the FCF devices are also unaware of whether they are communicating via a LAG with directly connected CNA devices or CNA devices connected via an FSB device.

The link aggregated FCoE system 200 may also be configured to respond to a variety of failure scenarios. In one failure scenario example, if a link in one of the LAGs 216 or 222 to the FCF device 202*a* becomes unavailable, data traffic may be send to the FCF device 202*b*. For example, the FCF device 202*b* will look up the destination MAC address and target device DID, and forward the data traffic based on that lookup (e.g., to the FCF device 202*a* via the ICL 204 if the target device DID identifies the target device 206, or directly to the target device 210 if the target device DID identifies the target device 210.) Similarly, if the link(s) in the LAG 222 to the FCF device 202*a* become unavailable, the FSB device 220 may change the trunk associations (discussed above) so that data traffic flow is to the FCF device 202*b* with the available links in the LAG 222.

In another failure scenario example, the ICL 204 may become unavailable. In response to unavailability of the ICL 204, the secondary link aggregation device (e.g., the FCF device 202*b* in the example above) will operate to bring down all the LAG ports to the LAGs 216 and 222. As such, communications with devices connected to the LAGs 216 and 222 will be unavailable, but communications between non-LAG/directly connected devices (e.g., the CNA devices 208, 212 and the target devices 206/210 connected via orphan ports) will be available. In such situations, if a login entry is cleared due to the unavailable ICL 204, the primary and/or secondary link aggregation device may send Registered State Change Notifications (RSCNs) to their directly connected target devices. Furthermore, if login entries are cleared due to the unavailability of the LAG to the secondary link aggregation device, the secondary link aggregation device may send RSCNs to its directly connected target device as well. Finally, any session changes in such situations will be reflected in ACLs as well.

In situations where the ICL 204 becomes unavailable and then subsequently becomes available again, the primary link aggregation device will operate to synchronize login information and name server information in its FCF database 306 with the secondary link aggregation node device. Furthermore, the secondary link aggregation node device will operate to synchronize the locally learned login and name server information in its FCF database 306 with the primary link aggregation device. Following availability of the ICL 204, the secondary link aggregation device will operate to make the LAGs 216 and 222 available again so that data traffic may be sent over those LAGs to both FCF devices 202*a* and 202*b*. Similarly as discussed above, any session changes in such situations will be reflected in ACLs as well.

In yet another failure scenario example, one of the FCF devices 202*a* or 202*b* may reboot or otherwise become unavailable. In such situations, communications through the LAGs 216 and 222 that are directed to a target device connected to the unavailable FCF device will be unavailable, but communications through the LAGs 216 and 222 that are directed to a target device connected to the available FCF device will be available. If any login entries are cleared due to the FCF device unavailability, the FCF device acting as the primary link aggregation device (e.g., the FCF device 202a if the FCF device 202b is unavailable, or the FCF device 202b if the FCF device 202a is unavailable and the FCF device 202b changes from acting as the secondary link aggregation device to acting as the primary link aggregation device) will operate to send RSCNs to its directly connected target device. Similarly as discussed above, any session changes in such situations will be reflected in ACLs as well.

In situations where FCF device becomes unavailable and then subsequently becomes available again, it will normally begin acting as a secondary link aggregation device. In such situations, the primary link aggregation device will operate to synchronize login information and name server information in its FCF database 306 with the secondary link aggregation node device. Furthermore, the secondary link aggregation node device will operate to synchronize the locally learned login and name server information in its FCF database 306 with the primary link aggregation device. Further still, the secondary link aggregation device will operate to make the LAGs 216 and 222 available again so that data traffic may be sent over those LAGs to both FCF devices 202a and 202b. Similarly as discussed above, any session changes in such situations will be reflected in ACLs as well.

While a few failure scenarios have been described, one of skill in the art in possession of the present disclosure will recognize that other situations may be dealt with as well. For example, if links in a LAG to one of the FCF devices 202a and 202b become unavailable, login entries may not be cleared, while if links in a LAG to both of the FCF devices 202a and 202b become unavailable, the login entries learned on that LAG may be cleared and RSCNs may be sent to the target devices by the primary link aggregation node. In another example, if an orphan link (i.e., a link to an orphan port) becomes unavailable, login information may be cleared in both of the FCF devices 202a and 202b, and RCSNs may be sent to the target devices. In yet another example, state change notifications may be sent by each FCF device based on zoning configurations and synced/local login information, and whenever a device logs in or out of the fabric, the login information may be synced and each FCF device 202a and 202b may send RSCNs to its directly connected devices based on the zoning configuration details. As such, a wide variety of functionality may be performed to enable the link aggregation FCoE systems discussed above while remaining within the scope of the present disclosure.

The discussion below provides several specific examples of how control data traffic and FCoE data traffic may be handled by the link aggregated FCoE system 200 using the teachings discussed above. However, one of skill in the art in possession of the present disclosure will recognize that a variety of other data traffic communications may be handled in the link aggregated FCoE system 200 while remaining within the scope of the present disclosure as well. In the examples, below, the FCF device 202a is a primary link aggregation device (referred to below as the primary FCF device 202a), and the FCF device 202b is a secondary link aggregation device (referred to below as the secondary FCF device 202b.)

Figure 6A:
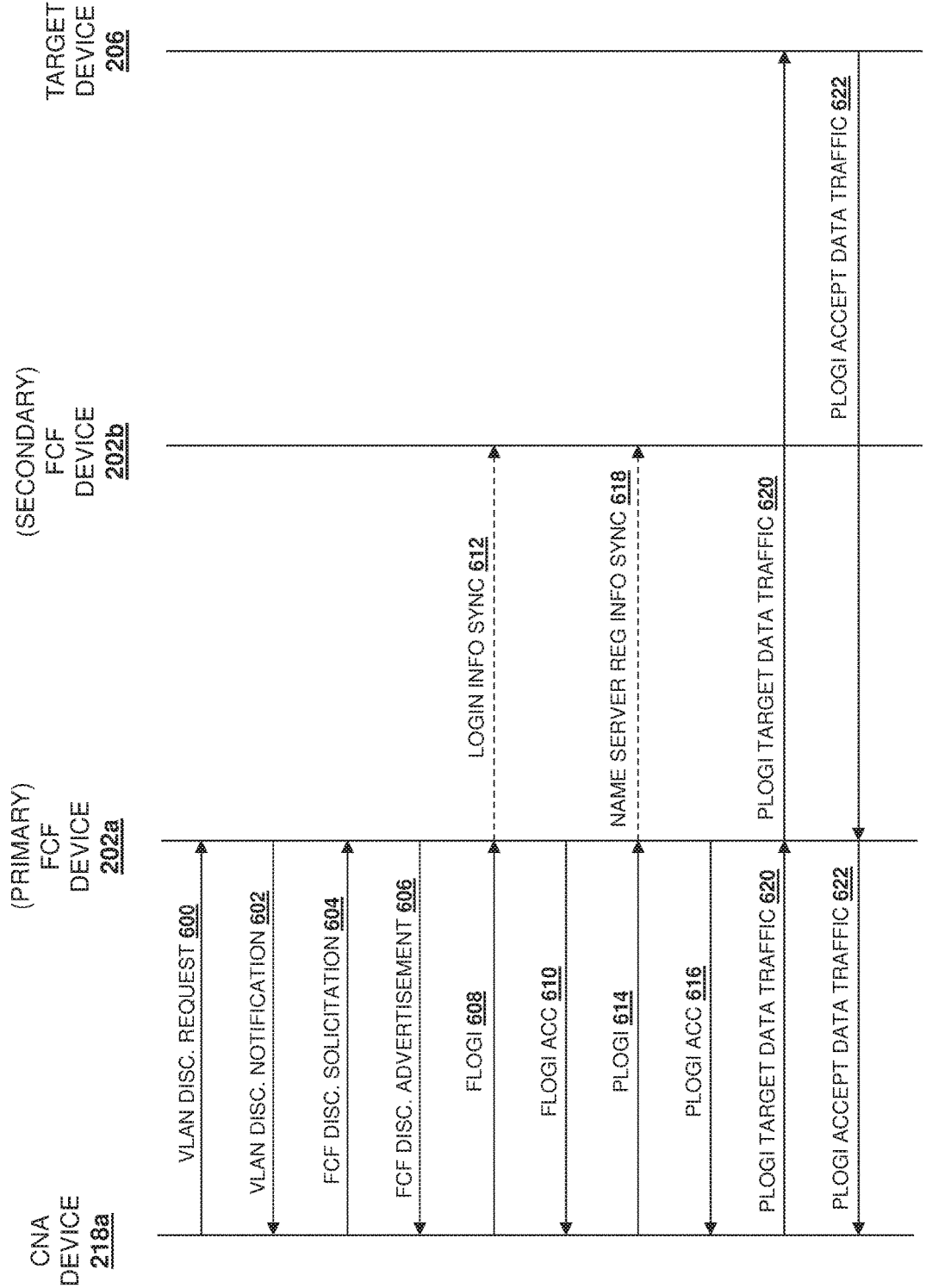
FIG. 6A is a swim lane diagram illustrating an embodiment of communications between devices the link aggregated FCoE system of FIG. 2.
Figure 6B:
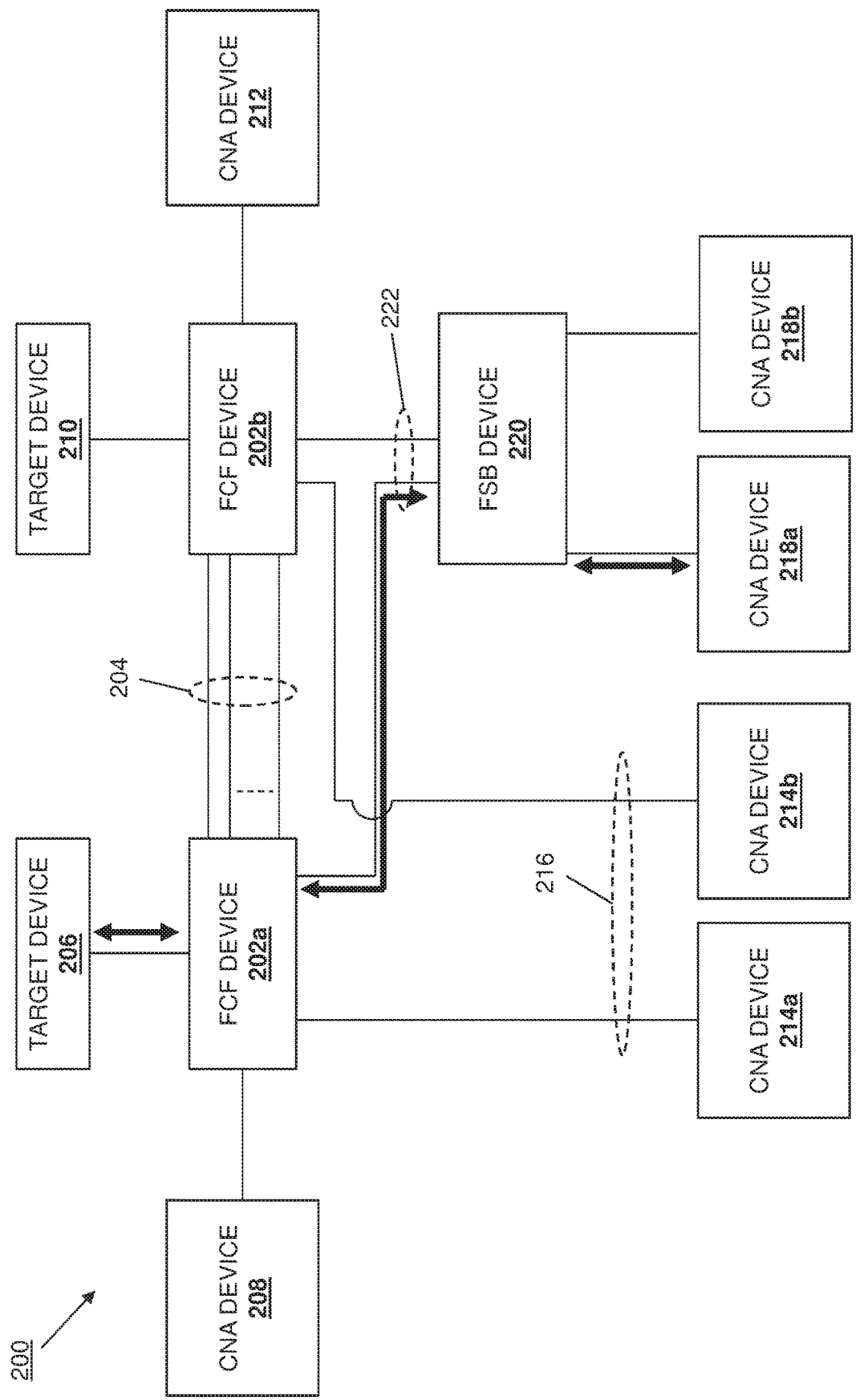
FIG. 6B is a schematic diagram illustrating an embodiment of the communications of FIG. 6A.

Referring first to FIGS. 6A and 6B, communications are illustrated between the CNA device 218a and the target device 206 when data traffic is forwarded by the FSB device 220 to the primary FCF device 202a. As such, discussions of the CNA device 218a sending communications to the primary FCF device 202a below assume the forwarding of those communications by the FSB device 220 to the primary FCF device 202a, and discussions of the primary FCF device 202a sending communications to the CNA device 218a below assume the forwarding of those communications by the FSB device 220 to the CNA device 218a. One of skill in the art in possession of the present disclosure will recognize that similar operations may be performed by the primary FCF device 202a and the target device 206 when the CNA device 208 communicates with the target device 206, with the exception that the CNA device 208 communicates directly with the primary FCF device 202a (rather than through the FSB device 220.)

As illustrated in FIGS. 6A and 6B, the CNA device 218a may send the primary FCF device 202a a VLAN discovery request communication 600 and, in response, the primary FCF device 202a may send the CNA device 218a a VLAN discovery notification communication 602. The CNA device 218a may then send the primary FCF device 202a an FCF discovery solicitation communication 604 and, in response, the primary FCF device 202a may send the CNA device 218a an FCF discovery advertisement communication 606. The CNA device 218a may then send the primary FCF device 202a a fabric login (FLOGI) communication 608 and, in response, the primary FCF device 202a may send the CNA device 218a a FLOGI accept communication 610 and may also perform a login information synchronization operation 612 with the secondary FCF device 202b. The CNA device 218a may then send the primary FCF device 202a a port login (PLOGI) communication 614 and, in response, the primary FCF device 202a may send the CNA device 218a a PLOGI accept communication 616 and may also perform a name server registration information synchronization operation 618 with the secondary FCF device 202b. The CNA device 218a may then send the primary FCF device 202a PLOGI-to-target or data-traffic-to-target communications 620 and, in response, the primary FCF device 202a may forward those PLOGI-to-target or data-traffic-to-target communications 620 to the target device 206, while the target device 206 may send to the primary FCF device 202a PLOGI accept or data traffic communications 622, and the primary FCF device 202a may forward those PLOGI accept or data traffic communications 622 to the CNA device 218a.

Figure 7A:
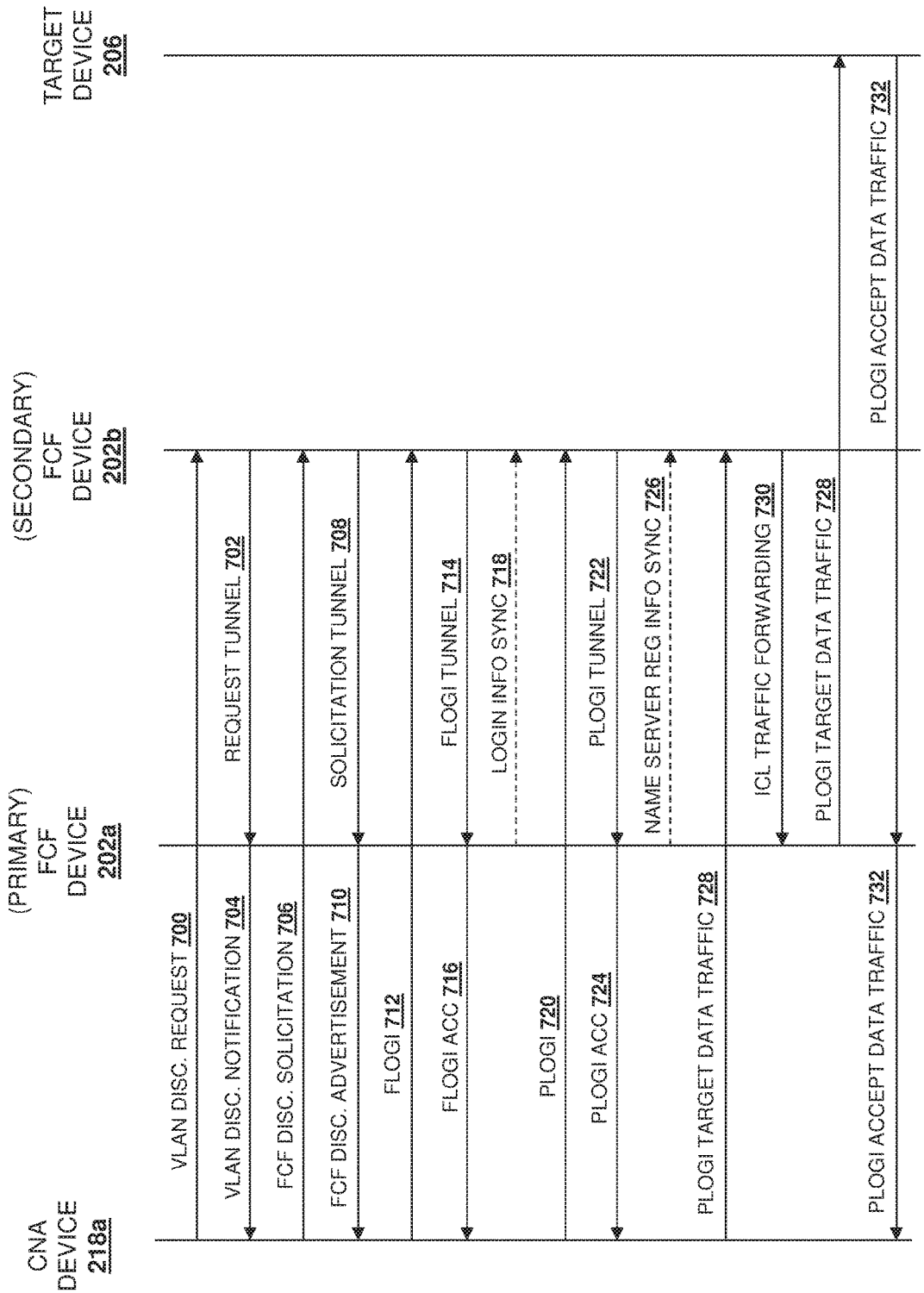
FIG. 7A is a swim lane diagram illustrating an embodiment of communications between devices the link aggregated FCoE system of FIG. 2.
Figure 7B:
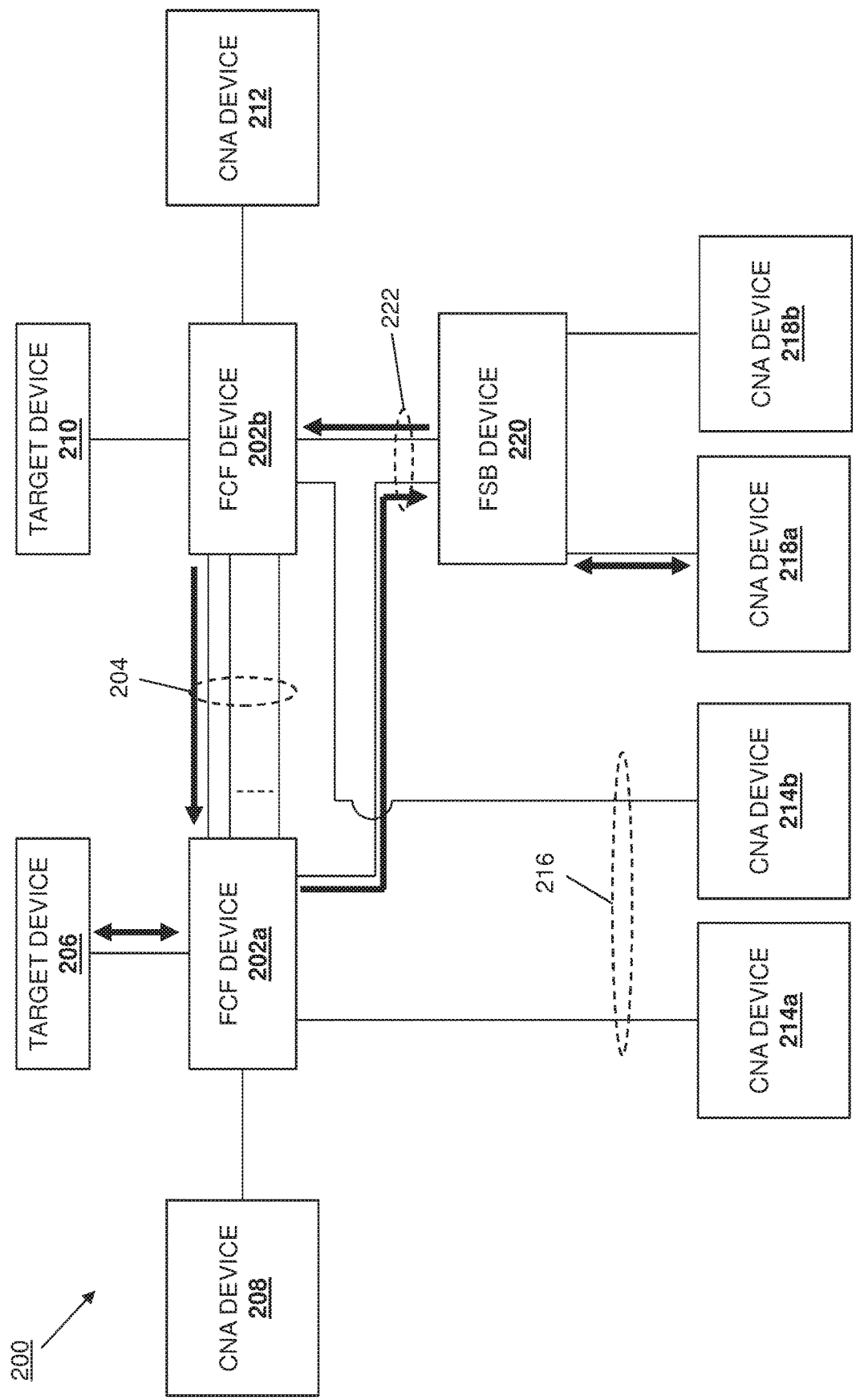
FIG. 7B is a schematic diagram illustrating an embodiment of the communications of FIG. 7A.

Referring next to FIGS. 7A and 7B, communications are illustrated between the CNA device 218a and the target device 206 when data traffic is forwarded by the FSB device 220 to the secondary FCF device 202b. As such, discussions of the CNA device 218a sending communications to the secondary FCF device 202b below assume the forwarding of those communications by the FSB device 220 to the secondary FCF device 202b, and discussions of the primary FCF device 202a sending communications to the CNA device 218a below assume the forwarding of those communications by the FSB device 220 to the CNA device 218a.

As illustrated in FIGS. 7A and 7B, the CNA device 218a may send the secondary FCF device 202b a VLAN discovery request communication 700 and, in response, the secondary FCF device 202b may perform a request tunnel operation 702 to provide the VLAN discovery request communication 700 to the primary FCF device 202a, with the primary FCF device 202a sending the CNA device 218a a VLAN discovery notification communication 704. The CNA device 218a may then send the secondary FCF device 202b an FCF discovery solicitation communication 706 and, in response, the secondary FCF device 202b may perform a solicitation tunnel operation 708 to provide the FCF discovery solicitation communication 706 to the primary FCF device 202*a*, with the primary FCF device 202*a* sending the CNA device 218*a* an FCF discovery advertisement communication 710. The CNA device 218*a* may then send the secondary FCF device 202*b* a fabric login (FLOGI) communication 712 and, in response, the secondary FCF device 202*b* may perform a FLOGI tunnel operation 714 to provide the FLOGI communication 712 to the primary FCF device 202*a*, with the primary FCF device 202*a* sending the CNA device 218*a* a FLOGI accept communication 716, and also performing a login information synchronization operation 718 with the secondary FCF device 202*b*. The CNA device 218*a* may then send the secondary FCF device 202*b* a port login (PLOGI) communication 720 and, in response, the secondary FCF device 202*b* may perform a PLOGI tunnel operation 722 to provide the PLOGI communication 720 to the primary FCF device 202*a*, with the primary FCF device 202*a* sending the CNA device 218*a* a PLOGI accept communication 724, and also performing a name server registration information synchronization operation 726 with the secondary FCF device 202*b*. The CNA device 218*a* may then send the secondary FCF device 202*b* PLOGI-to-target or data-traffic-to-target communications 728 and, in response, the secondary FCF device 202*b* may perform a ICL traffic forwarding operation 722 to provide the PLOGI-to-target or data-traffic-to-target communications 728 to the primary FCF device 202*a*, with the primary FCF device 202*a* sending those PLOGI-to-target or data-traffic-to-target communications 728 to the target device 206. The target device 206 may then send to the primary FCF device 202*a* PLOGI accept or data traffic communications 732, and the primary FCF device 202*a* may forward those PLOGI accept or data traffic communications 732 to the CNA device 218*a*.

Figure 8A:
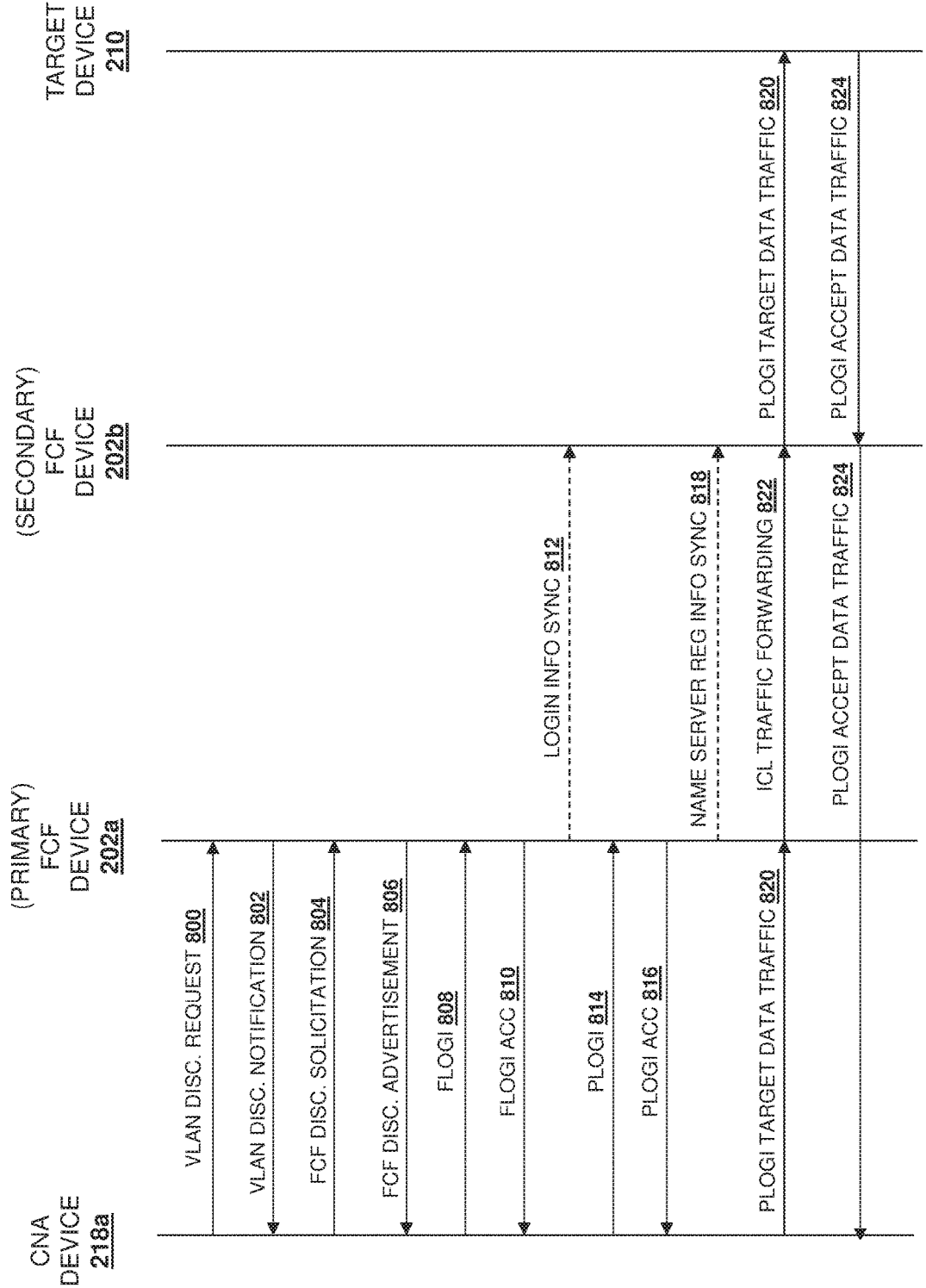
FIG. 8A is a swim lane diagram illustrating an embodiment of communications between devices the link aggregated FCoE system of FIG. 2.
Figure 8B:
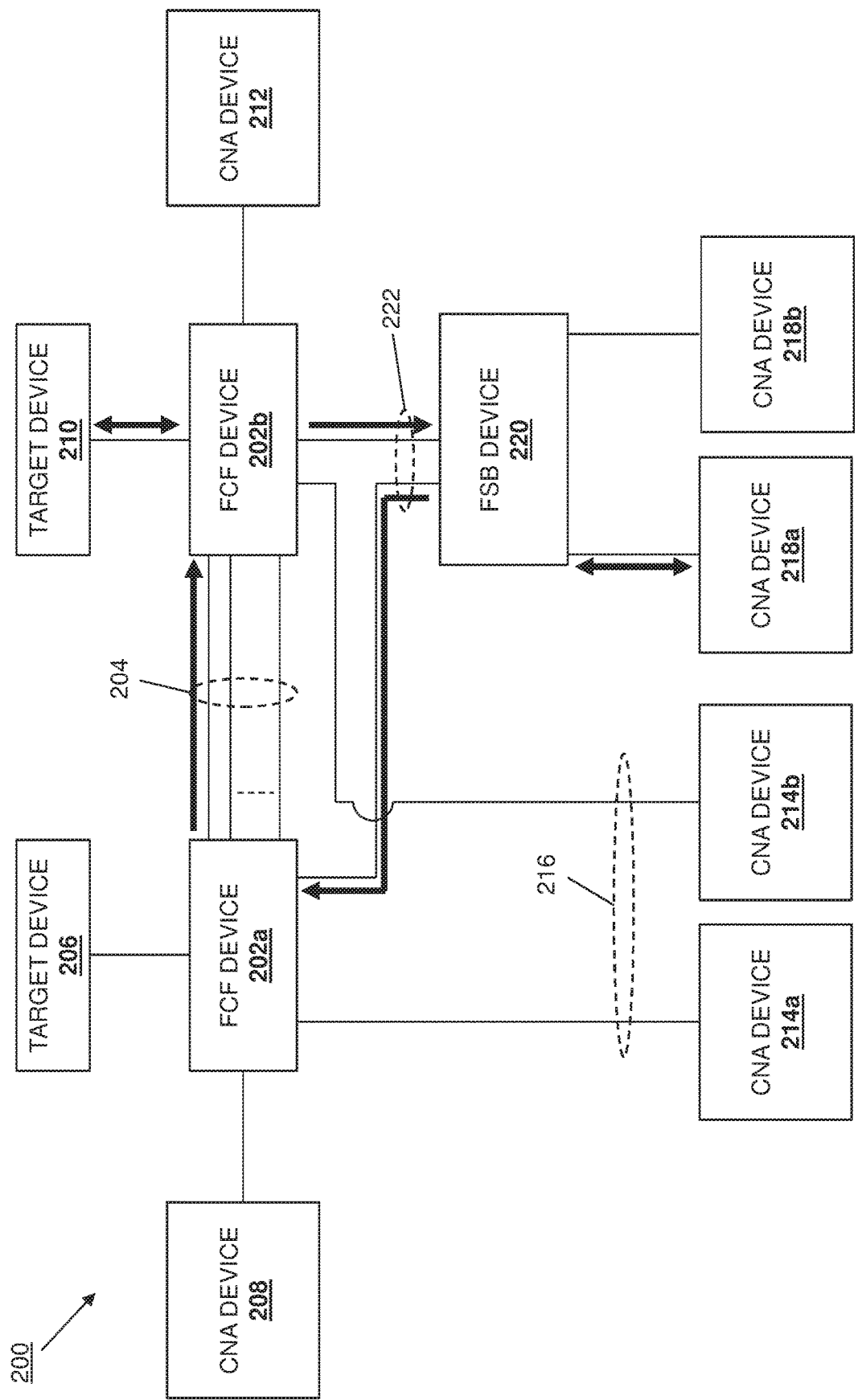
FIG. 8B is a schematic diagram illustrating an embodiment of the communications of FIG. 6A.

Referring now to FIGS. 8A and 8B, communications are illustrated between the CNA device 218*a* and the target device 210 when data traffic is forwarded by the FSB device 220 to the primary FCF device 202*a*. As such, discussions of the CNA device 218*a* sending communications to the primary FCF device 202*a* below assume the forwarding of those communications by the FSB device 220 to the primary FCF device 202*a*, and discussions of each of the primary FCF device 202*a* and the secondary FCF device 202*b* sending communications to the CNA device 218*a* below assume the forwarding of those communications by the FSB device 220 to the CNA device 218*a*.

As illustrated in FIGS. 8A and 8B, the CNA device 218*a* may send the primary FCF device 202*a* a VLAN discovery request communication 800 and, in response, the primary FCF device 202*a* may send the CNA device 218*a* a VLAN discovery notification communication 802. The CNA device 218*a* may then send the primary FCF device 202*a* an FCF discovery solicitation communication 804 and, in response, the primary FCF device 202*a* may send the CNA device 218*a* an FCF discovery advertisement communication 806. The CNA device 218*a* may then send the primary FCF device 202*a* a fabric login (FLOGI) communication 808 and, in response, the primary FCF device 202*a* may send the CNA device 218*a* a FLOGI accept communication 810 and may also perform a login information synchronization operation 812 with the secondary FCF device 202*b*. The CNA device 218*a* may then send the primary FCF device 202*a* a port login (PLOGI) communication 814 and, in response, the primary FCF device 202*a* may send the CNA device 218*a* a PLOGI accept communication 816 and may also perform a name server registration information synchronization operation 818 with the secondary FCF device 202*b*. The CNA device 218*a* may then send the primary FCF device 202*a* PLOGI-to-target or data-traffic-to-target communications 820 and, in response, the primary FCF device 202*a* may perform an ICL traffic forwarding operation 822 to forward the PLOGI-to-target or data-traffic-to-target communications 820 to the secondary FCF device 202*b*, with the second FCF device 202*b* forwarding the PLOGI-to-target or data-traffic-to-target communications 820 to the target device 206. The target device 206 may send to the secondary FCF device 202*b* PLOGI accept or data traffic communications 824, and the secondary FCF device 202*b* may forward those PLOGI accept or data traffic communications 824 to the CNA device 218*a*.

Figure 9A:
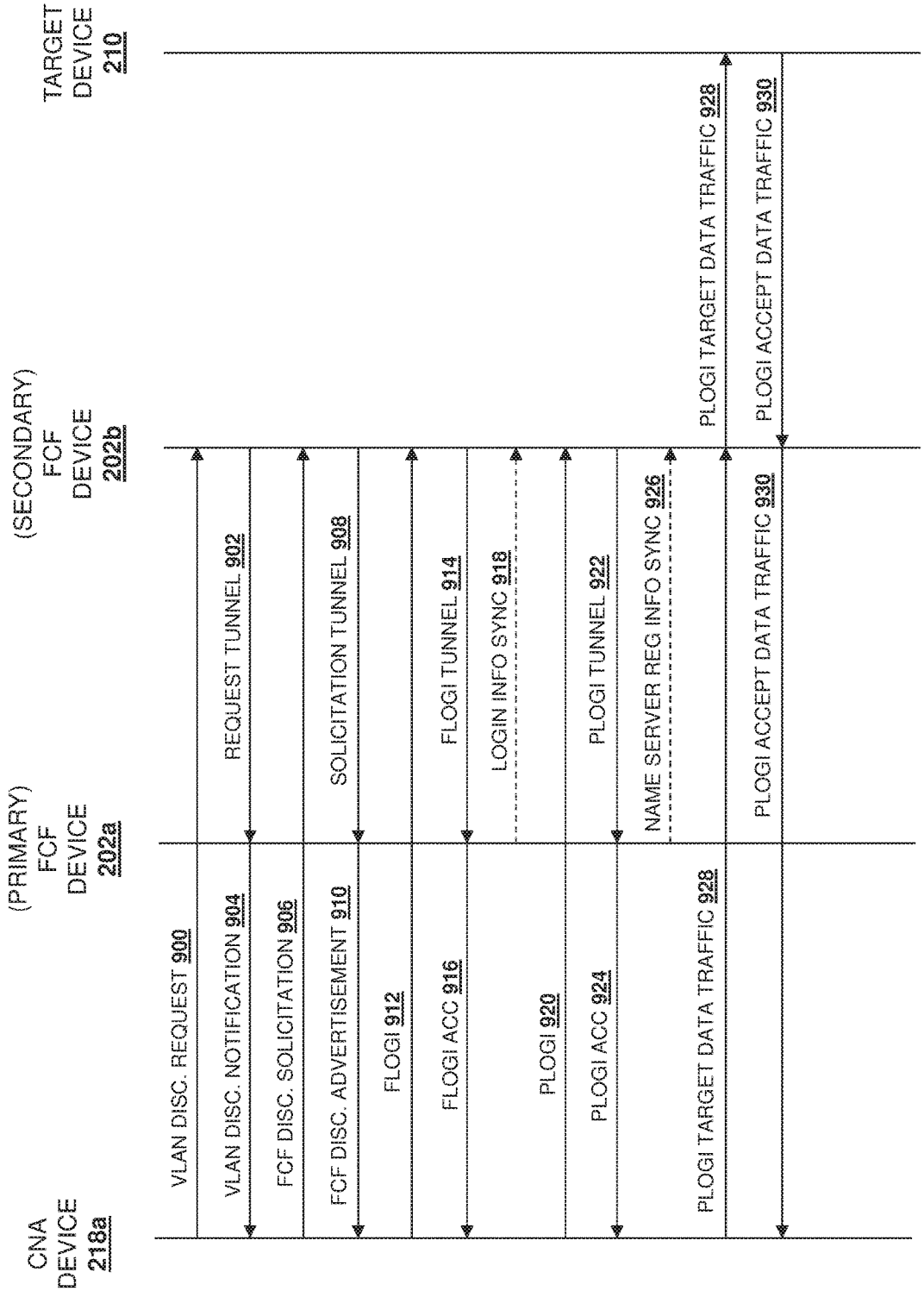
FIG. 9A is a swim lane diagram illustrating an embodiment of communications between devices in the link aggregated FCoE system of FIG. 2.
Figure 9B:
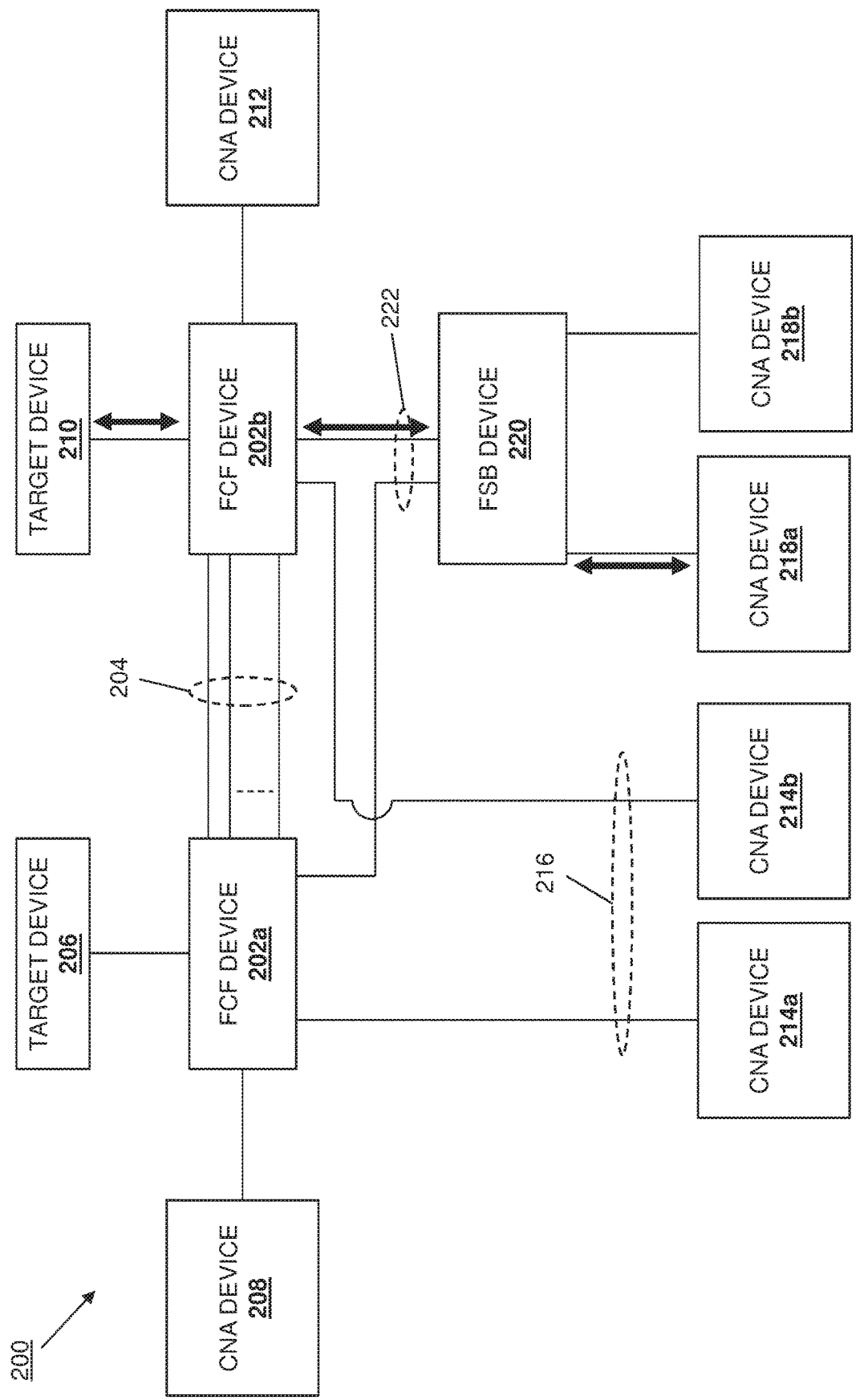
FIG. 9B is a schematic diagram illustrating an embodiment of the communications of FIG. 9A.

Referring next to FIGS. 9A and 9B, communications are illustrated between the CNA device 218*a* and the target device 210 when data traffic is forwarded by the FSB device 220 to the secondary FCF device 202*b*. As such, discussions of the CNA device 218*a* sending communications to the secondary FCF device 202*b* below assume the forwarding of those communications by the FSB device 220 to the secondary FCF device 202*b*, and discussions of the secondary FCF device 202*b* sending communications to the CNA device 218*a* below assume the forwarding of those communications by the FSB device 220 to the CNA device 218*a*.

As illustrated in FIGS. 9A and 9B, the CNA device 218*a* may send the secondary FCF device 202*b* a VLAN discovery request communication 900 and, in response, the secondary FCF device 202*b* may perform a request tunnel operation 902 to provide the VLAN discovery request communication 700 to the primary FCF device 202*a*, with the primary FCF device 202*a* sending the CNA device 218*a* a VLAN discovery notification communication 904. The CNA device 218*a* may then send the secondary FCF device 202*b* an FCF discovery solicitation communication 906 and, in response, the secondary FCF device 202*b* may perform a solicitation tunnel operation 908 to provide the FCF discovery solicitation communication 906 to the primary FCF device 202*a*, with the primary FCF device 202*a* sending the CNA device 218*a* an FCF discovery advertisement communication 910. The CNA device 218*a* may then send the secondary FCF device 202*b* a fabric login (FLOGI) communication 912 and, in response, the secondary FCF device 202*b* may perform a FLOGI tunnel operation 914 to provide the FLOGI communication 712 to the primary FCF device 202*a*, with the primary FCF device 202*a* sending the CNA device 218*a* a FLOGI accept communication 916, and also performing a login information synchronization operation 918 with the secondary FCF device 202*b*. The CNA device 218*a* may then send the secondary FCF device 202*b* a port login (PLOGI) communication 920 and, in response, the secondary FCF device 202*b* may perform a PLOGI tunnel operation 922 to provide the PLOGI communication 920 to the primary FCF device 202*a*, with the primary FCF device 202*a* sending the CNA device 218*a* a PLOGI accept communication 924, and also performing a name server registration information synchronization operation 926 with the secondary FCF device 202*b*. The CNA device 218*a* may then send the secondary FCF device 202*b* PLOGI-to-target or data-traffic-to-target communications 928 and, in response, the secondary FCF device 202*b* forwarding those PLOGI-to-target or data-traffic-to-target communications 928 to the target device 206. The target device 206 may then send to the secondary FCF device 202*b* PLOGI accept or data traffic communications 930, and the secondary FCF device 202*b* may forward those PLOGI accept or data traffic communications 930 to the CNA device 218*a*.

Figure 10A:
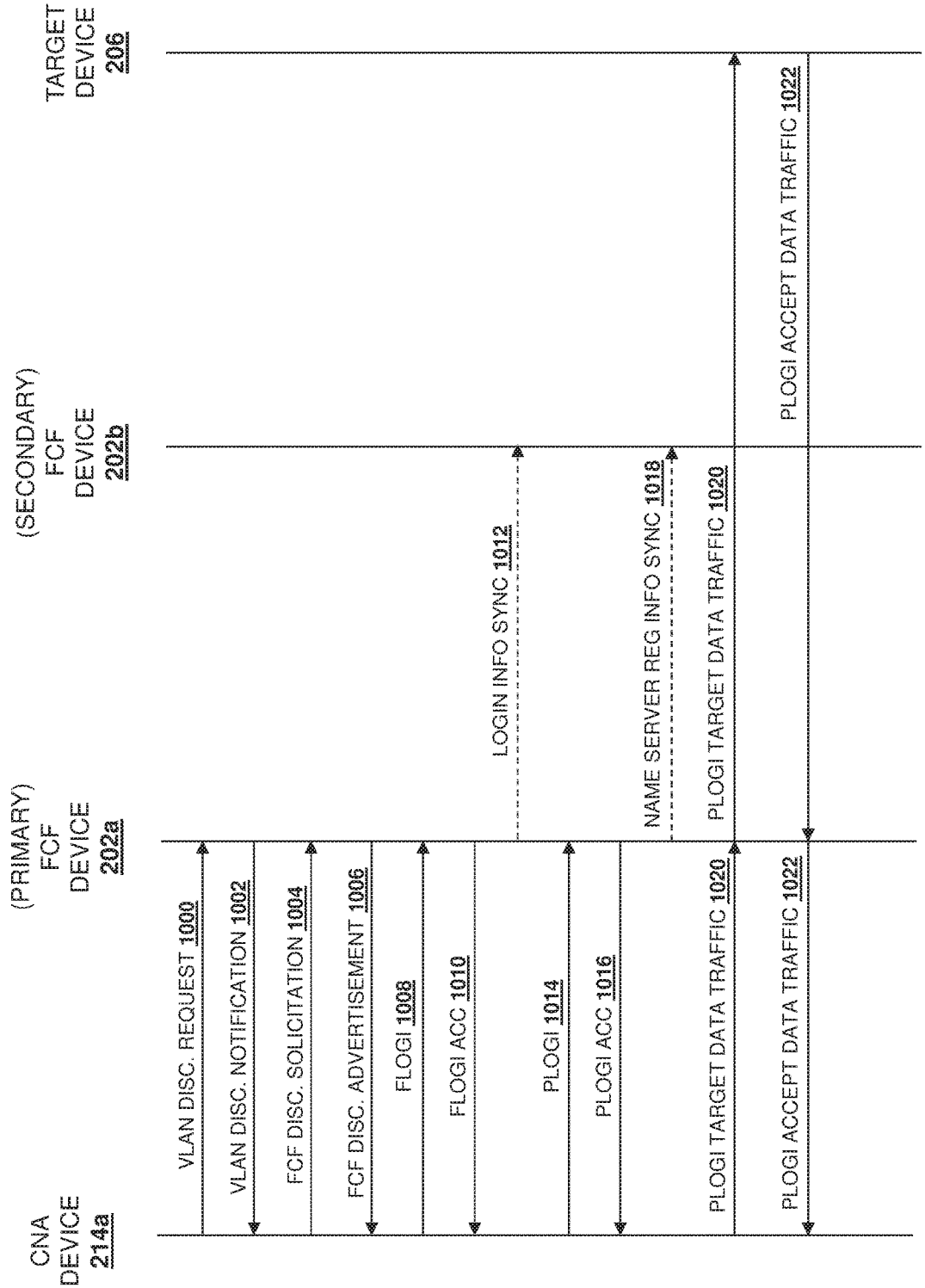
FIG. 10A is a swim lane diagram illustrating an embodiment of communications between devices in the link aggregated FCoE system of FIG. 2.
Figure 10B:
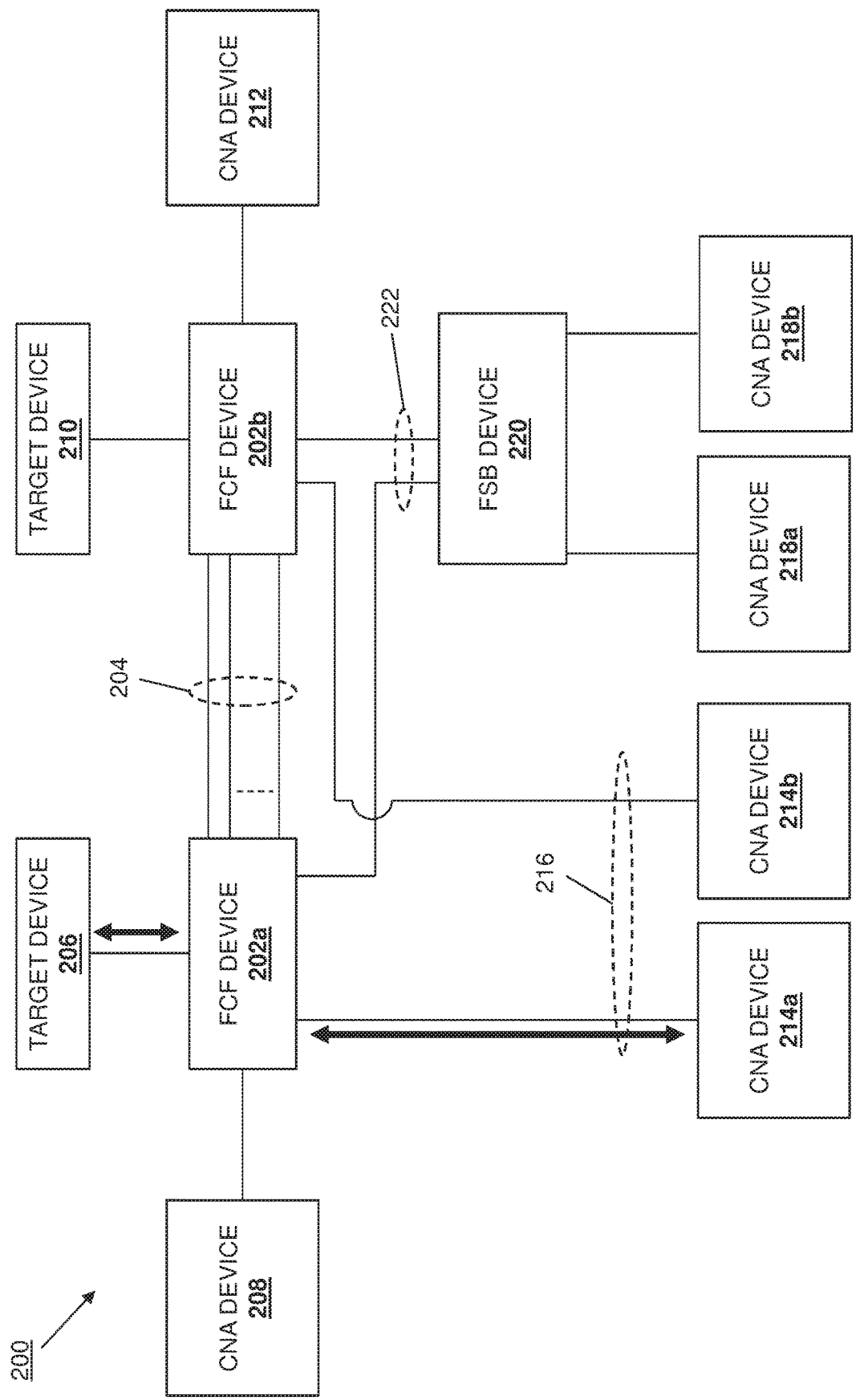
FIG. 10B is a schematic diagram illustrating an embodiment of the communications of FIG. 10A.

Referring now to FIGS. 10A and 10B, communications are illustrated between the CNA device 214*a* and the target device 206. As illustrated in FIGS. 10A and 10B, the CNA device 214a may send the primary FCF device 202a a VLAN discovery request communication 1000 and, in response, the primary FCF device 202a may send the CNA device 214a a VLAN discovery notification communication 1002. The CNA device 214a may then send the primary FCF device 202a an FCF discovery solicitation communication 1004 and, in response, the primary FCF device 202a may send the CNA device 214a an FCF discovery advertisement communication 1006. The CNA device 214a may then send the primary FCF device 202a a fabric login (FLOGI) communication 1008 and, in response, the primary FCF device 202a may send the CNA device 214a a FLOGI accept communication 1010 and may also perform a login information synchronization operation 1012 with the secondary FCF device 202b. The CNA device 214a may then send the primary FCF device 202a a port login (PLOGI) communication 1014 and, in response, the primary FCF device 202a may send the CNA device 214a a PLOGI accept communication 1016 and may also perform a name server registration information synchronization operation 1018 with the secondary FCF device 202b. The CNA device 214a may then send the primary FCF device 202a PLOGI-to-target or data-traffic-to-target communications 1020 and, in response, the primary FCF device 202a may forward the PLOGI-to-target or data-traffic-to-target communications 1020 to the target device 206. The target device 206 may send to the primary FCF device 202a PLOGI accept or data traffic communications 1022, and the primary FCF device 202a may forward those PLOGI accept or data traffic communications 1022 to the CNA device 214a.

Figure 11A:
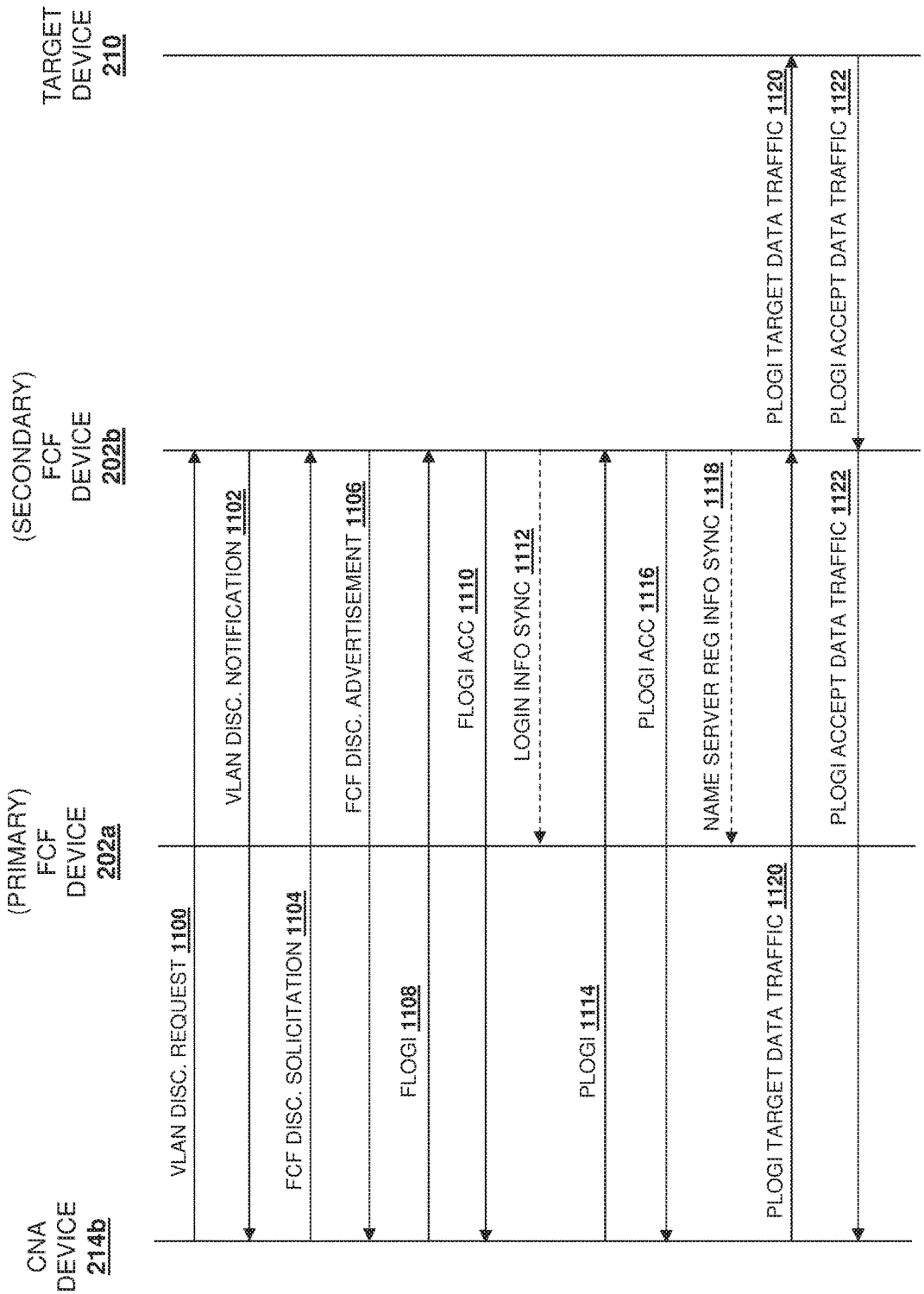
FIG. 11A is a swim lane diagram illustrating an embodiment of communications between devices in the link aggregated FCoE system of FIG. 2.
Figure 11B:
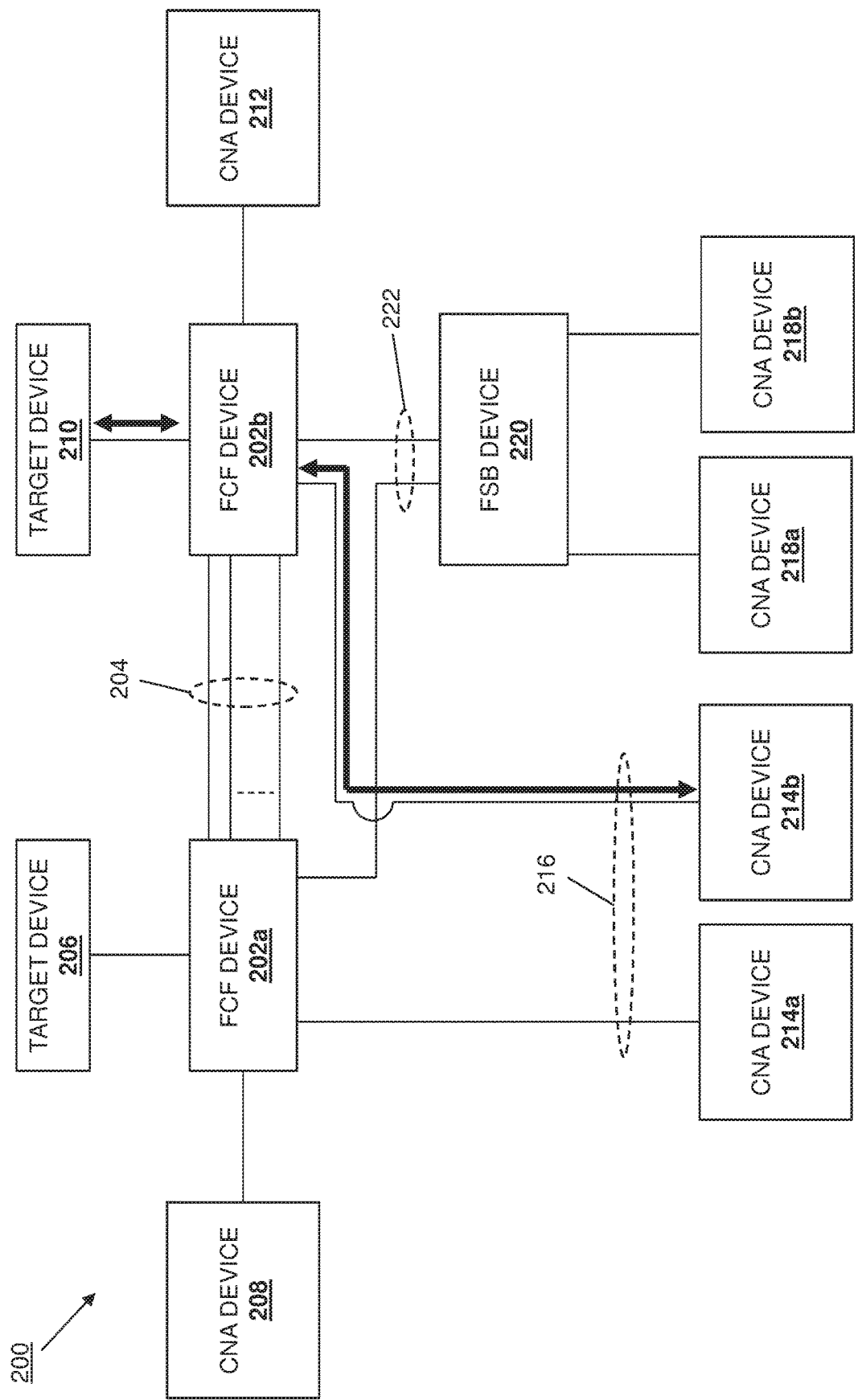
FIG. 11B is a schematic diagram illustrating an embodiment of the communications of FIG. 11A.

Referring now to FIGS. 11A and 11B, communications are illustrated between the CNA device 214b and the target device 210. As illustrated in FIGS. 11A and 11B, the CNA device 214b may send the secondary FCF device 202b a VLAN discovery request communication 1100 and, in response, the secondary FCF device 202b may send the CNA device 214b a VLAN discovery notification communication 1102. The CNA device 214b may then send the secondary FCF device 202b an FCF discovery solicitation communication 1104 and, in response, the secondary FCF device 202b may send the CNA device 214b an FCF discovery advertisement communication 1106. The CNA device 214b may then send the secondary FCF device 202b a fabric login (FLOGI) communication 1108 and, in response, the secondary FCF device 202b may send the CNA device 214b a FLOGI accept communication 1110 and may also perform a login information synchronization operation 1112 with the primary FCF device 202a. The CNA device 214b may then send the secondary FCF device 202b a port login (PLOGI) communication 1114 and, in response, the secondary FCF device 202b may send the CNA device 214b a PLOGI accept communication 1116 and may also perform a name server registration information synchronization operation 1118 with the primary FCF device 202a. The CNA device 214b may then send the secondary FCF device 202b PLOGI-to-target or data-traffic-to-target communications 1120 and, in response, the secondary FCF device 202b may forward the PLOGI-to-target or data-traffic-to-target communications 820 to the target device 210. The target device 210 may send to the secondary FCF device 202b PLOGI accept or data traffic communications 1122, and the secondary FCF device 202b may forward those PLOGI accept or data traffic communications 1122 to the CNA device 214b.

Figure 12A:
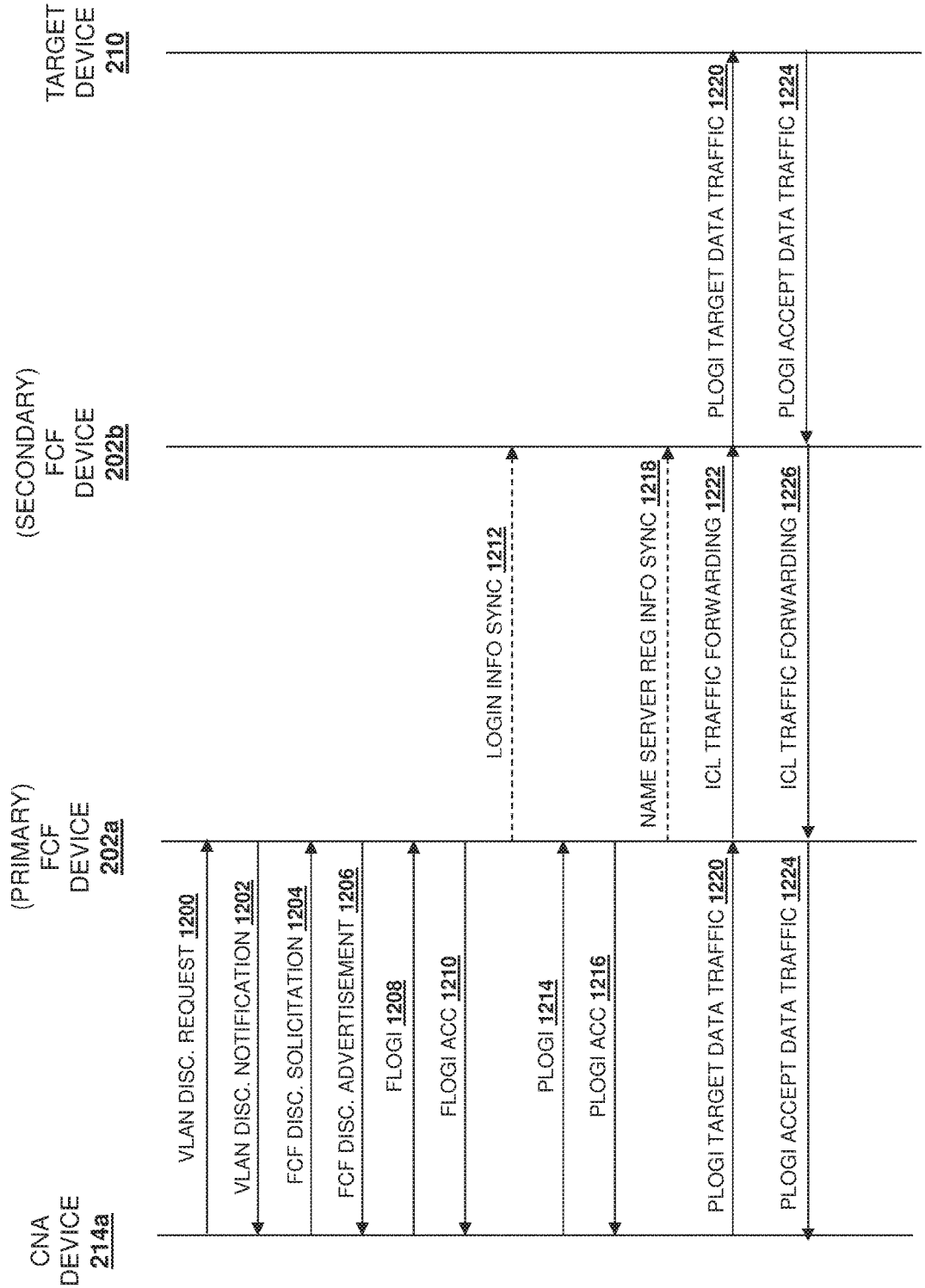
FIG. 12A is a swim lane diagram illustrating an embodiment of communications between devices in the link aggregated FCoE system of FIG. 2.
Figure 12B:
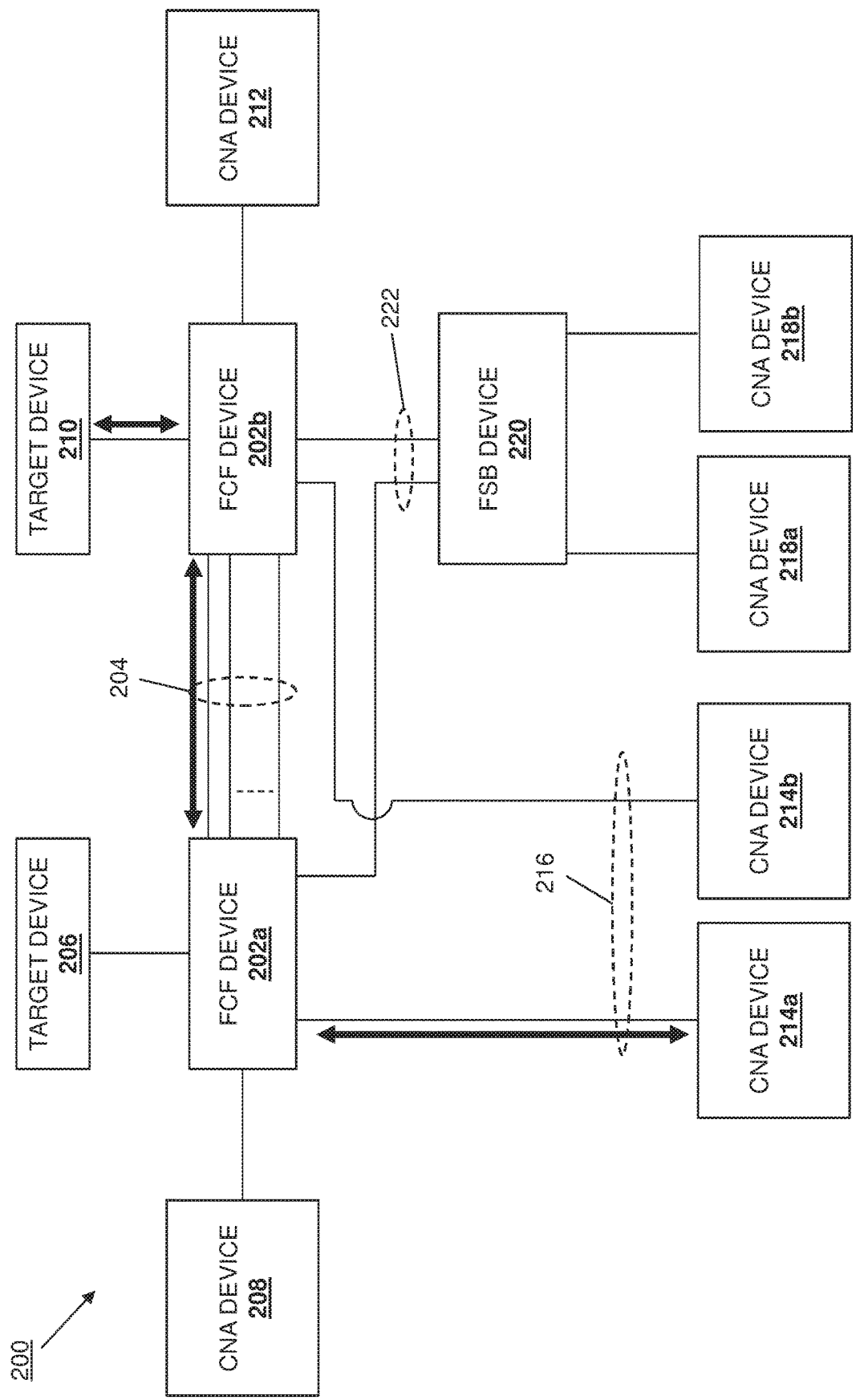
FIG. 12B is a schematic diagram illustrating an embodiment of the communications of FIG. 12A.

Referring now to FIGS. 12A and 12B, communications are illustrated between the CNA device 214a and the target device 210. One of skill in the art in possession of the present disclosure will recognize that similarly operations may be performed by the primary FCF device 202a, the secondary FCF device 202b, and the target device 210 when the CNA device 208 communicates with the target device 210. As illustrated in FIGS. 12A and 12B, the CNA device 214a may send the primary FCF device 202a a VLAN discovery request communication 1200 and, in response, the primary FCF device 202a may send the CNA device 214a a VLAN discovery notification communication 1202. The CNA device 214a may then send the primary FCF device 202a an FCF discovery solicitation communication 1204 and, in response, the primary FCF device 202a may send the CNA device 214a an FCF discovery advertisement communication 1206. The CNA device 214a may then send the primary FCF device 202a a fabric login (FLOGI) communication 1208 and, in response, the primary FCF device 202a may send the CNA device 214a a FLOGI accept communication 1210 and may also perform a login information synchronization operation 1212 with the secondary FCF device 202b. The CNA device 214a may then send the primary FCF device 202a a port login (PLOGI) communication 1214 and, in response, the primary FCF device 202a may send the CNA device 214a a PLOGI accept communication 1216 and may also perform a name server registration information synchronization operation 1218 with the secondary FCF device 202b. The CNA device 214a may then send the primary FCF device 202a PLOGI-to-target or data-traffic-to-target communications 1220 and, in response, the primary FCF device 202a may perform an ICL traffic forwarding operation 1222 to forward the PLOGI-to-target or data-traffic-to-target communications 1220 to the secondary FCF device 202b, with the second FCF device 202b forwarding the PLOGI-to-target or data-traffic-to-target communications 1220 to the target device 210. The target device 210 may send to the secondary FCF device 202b PLOGI accept or data traffic communications 1224 and, in response, the secondary FCF device 202b may perform an ICL traffic forwarding operation 1226 to forward the PLOGI accept or data traffic communications 1224 to the primary FCF device 202a, with the primary FCF device 202a forwarding those PLOGI accept or data traffic communications 1224 to the CNA device 214a.

Figure 13A:
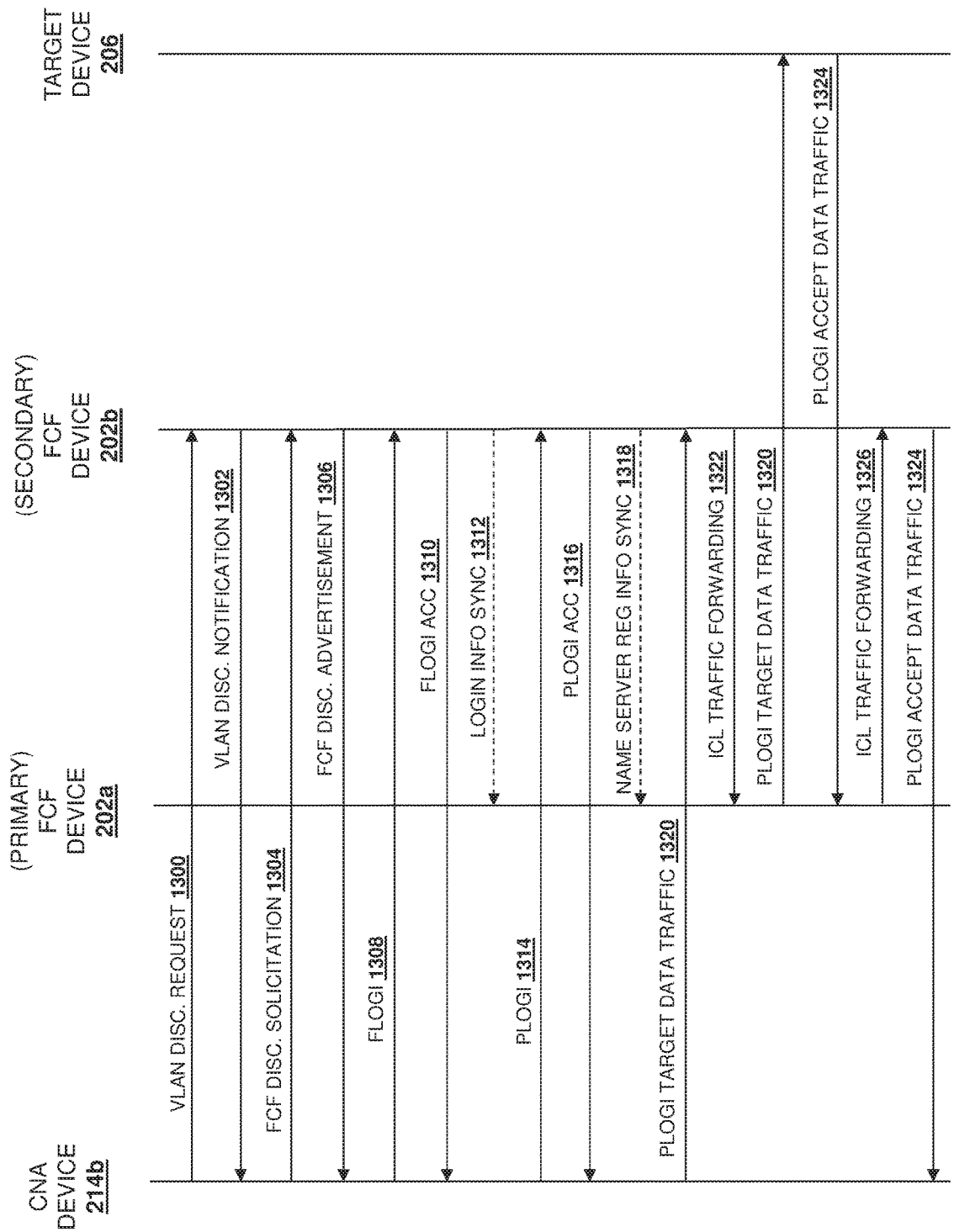
FIG. 13A is a swim lane diagram illustrating an embodiment of communications between devices in the link aggregated FCoE system of FIG. 2.
Figure 13B:
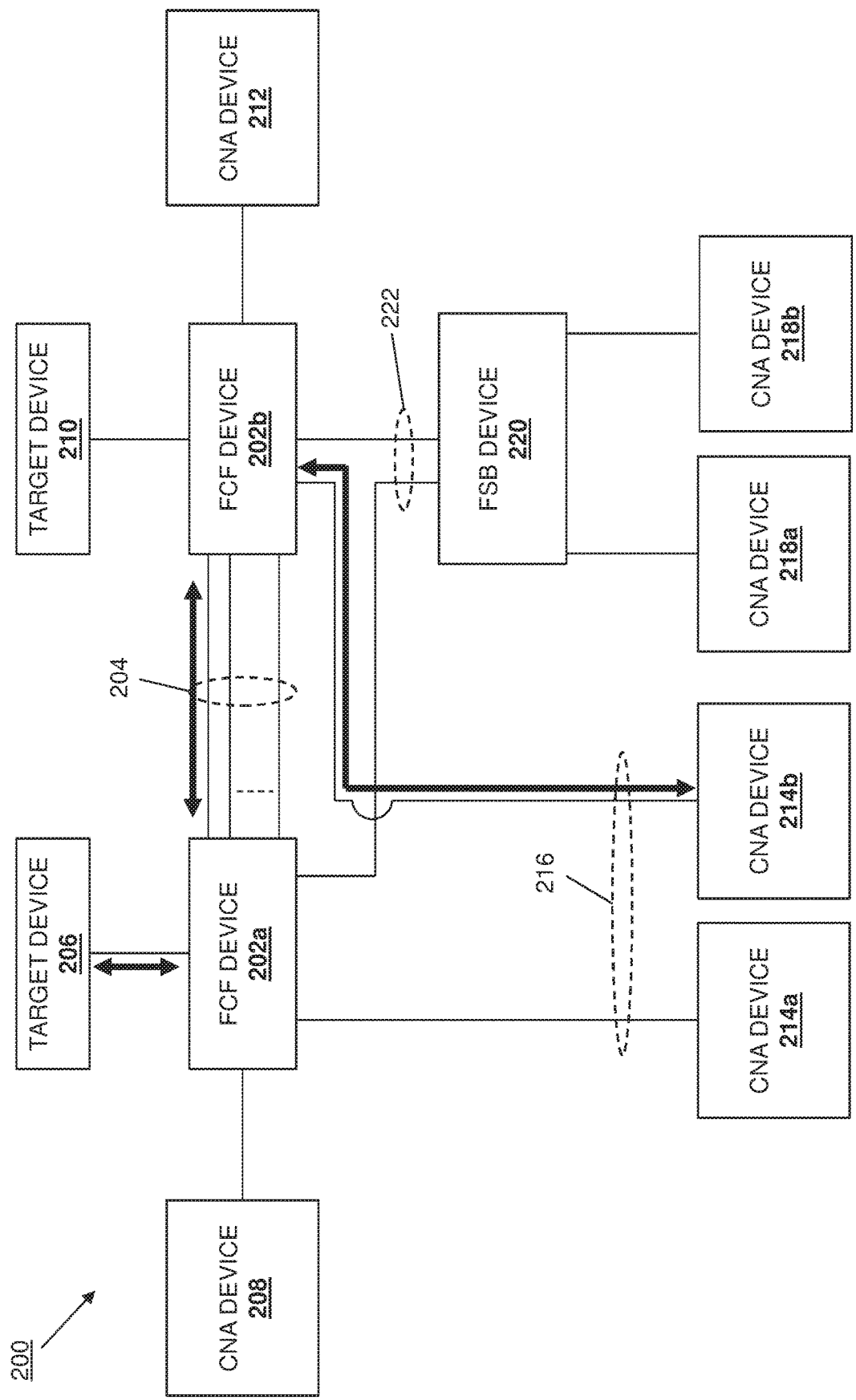
FIG. 13B is a schematic diagram illustrating an embodiment of the communications of FIG. 13A.

Referring now to FIGS. 13A and 13B, communications are illustrated between the CNA device 214b and the target device 206. As illustrated in FIGS. 13A and 13B, the CNA device 214b may send the secondary FCF device 202b a VLAN discovery request communication 1300 and, in response, the secondary FCF device 202b may send the CNA device 214b a VLAN discovery notification communication 1302. The CNA device 214b may then send the secondary FCF device 202b an FCF discovery solicitation communication 1304 and, in response, the secondary FCF device 202b may send the CNA device 214b an FCF discovery advertisement communication 1306. The CNA device 214b may then send the secondary FCF device 202b a fabric login (FLOGI) communication 1308 and, in response, the secondary FCF device 202b may send the CNA device 214b a FLOGI accept communication 1310 and may also perform a login information synchronization operation 1312 with the primary FCF device 202a. The CNA device 214b may then send the secondary FCF device 202b a port login (PLOGI) communication 1314 and, in response, the secondary FCF device 202b may send the CNA device 214b a PLOGI accept communication 1316 and may also perform a name server registration information synchronization operation 1318 with the primary FCF device 202a. The CNA device 214b may then send the secondary FCF device 202b PLOGI-to-target or data-traffic-to-target communications 1320 and, in response, the secondary FCF device 202b may perform ICL traffic forwarding operations 1322 to forward the PLOGI-to-target or data-traffic-to-target communications 1320 to the primary FCF device 202a, with the primary FCF device 202a forwarding the PLOGI-to-target or data-traffic-to-target communications 1320 to the target device 206. The target device 206 may then send to the secondary FCF device 202b PLOGI accept or data traffic communications 1324, and, in response, the secondary FCF device 202b may perform ICL traffic forwarding operations 1326 to forward those PLOGI accept or data traffic communications 1324 to the primary FCF device 202a, with the primary FCF device 202a forwarding those PLOGI accept or data traffic communications 1324 to the CNA device 214b.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A link aggregated Fibre Channel over Ethernet system, comprising:
   a first target device;
   a first Fibre Channel Forwarder (FCF) device that is coupled to the first target device and a Link Aggregation Group (LAG), wherein the first FCF device is associated with a common FCF Media Access Control (MAC) address, and wherein the first FCF device is configured to:
      receive, through the LAG, first control data traffic;
      populate a first FCF device table in the first FCF device based on the first control data traffic, wherein the first FCF device table includes fabric login information and name server registration information generated from the first control traffic;
      send, through at least one ICL, first synchronization information that includes the fabric login information and the name server registration information to a second FCF device to cause the synchronization of a second FCF device table in the second FCF device with the first FCF device table;
      receive, through the LAG, first Fibre Channel over Ethernet (FCoE) data traffic that is directed to the common FCF MAC address and that includes a first target device destination identifier; and
      forward, using the first FCF device table in response to determining that the first target device destination identifier is associated with the first target device, the first FCoE data traffic to the first target device; and
   a second FCF device that is coupled to the LAG, and coupled to the first FCF device by at least one Inter-Chassis Link (ICL), wherein the second FCF device is associated with the common FCF MAC address, and wherein the second FCF device is configured to:
      receive, through the LAG, second FCoE data traffic that is directed to the common FCF MAC address and that includes the first target device destination identifier; and
      forward, through the at least one ICL in response to determining, using the second FCF device table, that the first target device destination identifier is associated with the first target device, the second FCoE data traffic to the first FCF device, wherein the first FCF device is configured to forward the second FCoE data traffic to the first target device based on the first target device destination identifier.

2. The system of claim 1, further comprising:
   a second target device that is coupled to the second FCF device,
   wherein the first FCF device is configured to utilize a first range of port numbers to assign a first Fibre Channel identifier to the first target device, and
   wherein the second FCF device is configured to utilize a second range of port numbers that are different than the first range of port numbers to assign a second Fibre Channel identifier to the second target device that is different than the first Fibre Channel identifier.

3. The system of claim 1, further comprising:
   a Fibre Channel Initialization Protocol (FIP) snooping bridge device that is coupled to the LAG, wherein the FIP snooping bridge device is configured to:
      associate all of the links in the LAG with a first trunk;
      identify at least one first FCF device link in the LAG that is connected to the first FCF device;
      associate the at least one first FCF device link with a second trunk;
      identify at least one second FCF device link in the LAG that is connected to the second FCF device; and
      associate the at least one second FCF device link with a third trunk.

4. The system of claim 3, wherein the first FIP snooping bridge device is configured to:
   forward, using the first trunk, non-FCoE data traffic;
   forward, using the second trunk, FCoE traffic directed to the first target device coupled to the first FCF device; and
   forward, using the third trunk, FCoE traffic directed to a second target device coupled to the second FCF device.

5. The system of claim 1, wherein the first FCF device is a primary link aggregation device that is configured to handle control data traffic received through the LAG, and wherein the second FCF device is a secondary link aggregation device that is configured to forward control data traffic that is received through the LAG to the first FCF device through the at least one ICL.

6. The system of claim 1, wherein the first FCF device is configured to apply a first zoning configuration and synchronize the first zoning configuration with the second FCF device through the at least one ICL, and wherein the second FCF device is configured to apply a second zoning configuration and synchronize the second zoning configuration with the first FCF device through the at least one ICL.

7. The system of claim 1,
   receive, through the LAG, second control data traffic;
   tunnel, through the at least one ICL, the second control data traffic to the first FCF device to cause the first FCF device to populate the first FCF device table in the first FCF device based on the second control data traffic;
   receive, through the at least one ICL, second synchronization information from the first FCF device; and
   synchronize, using the second synchronization information, the second FCF device table in the second FCF device with the first FCF device table.

8. An Information Handling System (IHS), comprising:
   a communication subsystem;
   a processing system that is coupled to the communications subsystem;
   a memory system that is coupled to the processing system and that includes instructions that, when executed by the processing system, cause the processing system to provide a Fibre Channel Forwarding (FCF) engine that is configured to:
  receive, through the communication subsystem via a Link Aggregation Group (LAG), first control data traffic;
  populate a first FCF device table based on the first control data traffic, wherein the first FCF device table includes fabric login information and name server registration information generated from the first control traffic;
  send, through the communication subsystem via an Inter-Chassis Link (ICL) to an FCF device, first synchronization information that includes the fabric login information and the name server registration information to cause the synchronization of a second FCF device table in the FCF device with the first FCF device table;
  receive, through the communication subsystem via the LAG, first Fibre Channel over Ethernet (FCoE) data traffic that is directed to a common FCF MAC address and that includes a first target device destination identifier;
  forward, through the communication subsystem in response to determining, using the first FCF device table, that the first target device destination identifier is associated with a first target device that is coupled to the communication subsystem, the first FCoE data traffic to the first target device;
  receive, through the communication subsystem via the LAG, second FCoE data traffic that is directed to the common FCF MAC address and that includes a second target device destination identifier; and
  forward, through the communication subsystem via the ICL in response to determining, using the first FCF device table, that the second target device destination identifier is associated with a second target device that is reachable through the FCF device that is coupled to the ICL, the second FCoE data traffic to the FCF device.

9. The IHS of claim 8, wherein the first FCF engine is configured to:
  utilize a first range of port numbers to assign a first Fibre Channel identifier to the first target device, and wherein the first range of port numbers are different than a second range of port numbers that are utilized by the FCF device to assign a second Fibre Channel identifier to the second target device that is different than the first Fibre Channel identifier.

10. The IHS of claim 8, wherein the FCF engine is configured to:
  handle first control data traffic received through the communication subsystem via the LAG; and
  receive, through the communication subsystem via the ICL, second control data traffic that is forwarded by the FCF device.

11. The IHS of claim 8, wherein the FCF engine is configured to:
  apply a first zoning configuration and synchronize the first zoning configuration with the FCF device through the communication subsystem via the ICL; and
  synchronize, through the communication subsystem via the ICL, a second zoning configuration that was applied by the FCF device.

12. A method for providing link aggregated Fibre Channel over Ethernet communications, comprising:
  receiving, by a first Fibre Channel Forwarder (FCF) device via a Link Aggregation Group (LAG), first control data traffic;
  populating, by the first FCF device, a first FCF device table in the first FCF device based on the first control data traffic;
  sending, by the first FCF device via an Inter-Chassis Link (ICL) to a second FCF device, first synchronization information to cause the synchronization of a second FCF device table in the second FCF device with the first FCF device table;
  receiving, by the first FCF device via the LAG, first Fibre Channel over Ethernet (FCoE) data traffic that is directed to a common FCF MAC address and that includes a first target device destination identifier;
  forwarding, by the first FCF device using the first FCF device table and in response to determining that the first target device destination identifier is associated with a first target device that is coupled to the first FCF device, the first FCoE data traffic to the first target device;
  receiving, by the first FCF device via the LAG, second FCoE data traffic that is directed to the common FCF MAC address and that includes a second target device destination identifier; and
  forwarding, by the first FCF device through the ICL in response to determining, using the first FCF device table, that the second target device destination identifier is associated with a second target device that is reachable through a second FCF device that is coupled to the ICL, the second FCoE data traffic to the second FCF device.

13. The method of claim 12, further comprising:
  utilizing, by the first FCF device, a first range of port numbers to assign a first Fibre Channel identifier to the first target device, wherein the first range of port numbers are different than a second range of port numbers that are utilized by the second FCF device to assign a second Fibre Channel identifier to the second target device that is different than the first Fibre Channel identifier.

14. The method of claim 12, further comprising:
  handling, by the first FCF device, first control data traffic received via the LAG; and
  receiving, by the first FCF device via the ICL, second control data traffic forwarded by the second FCF device.

15. The method of claim 12, further comprising:
  applying, by the first FCF device, a first zoning configuration and synchronizing the first zoning configuration with the second FCF device via the ICL; and
  synchronizing, by the first FCF device via the ICL, a second zoning configuration that was applied by the second FCF device.

16. The method of claim 12, further comprising:
  associating, by a Fibre Channel Initialization Protocol (FIP) snooping bridge device that is coupled to the LAG, all of the links in the LAG with a first trunk;
  identifying, by the FIP snooping bridge device, at least one first FCF device link in the LAG that is connected to the first FCF device;
  associating, by the FIP snooping bridge device, the at least one first FCF device link with a second trunk;
  identifying, by the FIP snooping bridge device, at least one second FCF device link in the LAG that is connected to the second FCF device; and
  associating, by the FIP snooping bridge device, the at least one second FCF device link with a third trunk.

17. The method of claim 16, further comprising:
forwarding, by the FIP snooping bridge device using the first trunk, non-FCoE data traffic;
forwarding, by the FIP snooping bridge device using the second trunk, FCoE traffic directed to the first target device coupled to the first FCF device; and
forwarding, by the FIP snooping bridge device using the third trunk, FCoE traffic directed to the second target device coupled to the second FCF device.

* * * * *